United States Patent [19]

Kime et al.

[11] Patent Number: 5,247,493
[45] Date of Patent: Sep. 21, 1993

[54] MAGNETO-OPTICAL RECORDING AND REPRODUCING DISK DEVICE HAVING A BIMORPH TYPE ACTUATOR WITH SPECIFIC STRUCTURES FOR MOUNTING A MAGNETIC HEAD IN OPPOSING TO THE SURFACE OF THE DISK

[75] Inventors: Kenjiro Kime; Keiji Nakamura, both of Nagaokakyo; Isao Watanabe; Hajime Nakajima, both of Amagasaki, all of Japan

[73] Assignee: Mitsubishi Denki Kabushiki Kaisha, Tokyo, Japan

[21] Appl. No.: 333,686

[22] Filed: Apr. 5, 1989

[30] Foreign Application Priority Data

| Apr. 6, 1988 | [JP] | Japan | 63-86116 |
| May 31, 1988 | [JP] | Japan | 63-131385 |
| May 31, 1988 | [JP] | Japan | 63-131388 |
| Jul. 19, 1988 | [JP] | Japan | 63-178025 |
| Feb. 9, 1989 | [JP] | Japan | 1-28597 |

[51] Int. Cl.$^5$ ............. G11B 13/04; G11B 11/12; G11B 11/10
[52] U.S. Cl. ............. 369/13; 360/114; 360/103
[58] Field of Search .......... 369/13, 110, 112, 124, 369/44.41, 44.42; 360/59, 114, 66, 103, 77.02; 250/201 DF

[56] References Cited

U.S. PATENT DOCUMENTS

| 4,661,944 | 4/1987 | Jan Sluys | 369/44.41 |
| 4,682,315 | 7/1987 | Uejima | 369/44.42 |
| 4,706,232 | 11/1987 | Funada et al. | 360/114 |
| 4,742,218 | 5/1988 | Nakamura et al. | 369/44.42 |
| 4,764,912 | 8/1988 | Andó et al. | 369/13 |
| 4,843,502 | 6/1989 | Tagawa | 360/105 |
| 4,858,040 | 8/1989 | Hazebrouck | 360/77.02 |
| 4,937,801 | 6/1990 | Miura et al. | 360/114 |

FOREIGN PATENT DOCUMENTS

| 55-28586 | 2/1980 | Japan . |
| 56-16936 | 2/1981 | Japan . |
| 62-185269 | 8/1987 | Japan | 360/114 |
| 62-252535 | 11/1987 | Japan . |
| 63-66735 | 3/1988 | Japan . |
| 63-108576 | 5/1988 | Japan . |

OTHER PUBLICATIONS

S. Kanamaru et al., "Video Disk Player Utilizing a Semiconductor Laser", O plues E, No. 59. (A Japanese Trade Journal).

Primary Examiner—Hoa T. Nguyen
Attorney, Agent, or Firm—Leydig, Voit & Mayer

[57] ABSTRACT

Magneto-optical disk recording and reproducing devices and actuators and distance detectors for use therewith are disclosed. The magneto-optical disk device includes a bimorph type actuator or an electromagnetic actuator for driving the magnetic head of the magneto-optical disk device. The bimorph actuator has a metallic shim having a width that varies with respect to the longitudinal distance in inverse proportion to the normal function of the first or the second free natural vibration mode. Alternatively, the bimorph type actuator has a recess formed on a bimorph element to expose a piezoelectric portion which outputs a voltage corresponding to the acceleration of the vibration of the actuator. The driver circuit of the actuator reduces the driving voltage when the frequency of the voltage generated at the recess comes into the neighborhood of a higher resonance frequency of the actuator. The optical distance detector comprises a light-emitting diode and a pair of photodiodes which detects the amount of light incident thereon after the light is reflected from a surface of an object the distance to which is measured. The geometric parameters of the photodiodes are selected such that the output of a first photodiode decreases as the measured distance increases while the output of a second photodiode increases as the measured distance increases. Thus, the normalized differential output of the two photodiodes, from which the measured distance is determined, varies substantially linearly with respect to the measured distance. In preferred forms, the photodetectors have stepped concentric configurations so that small distances can be measured accurately and efficiently.

15 Claims, 31 Drawing Sheets

FIG.13(a)
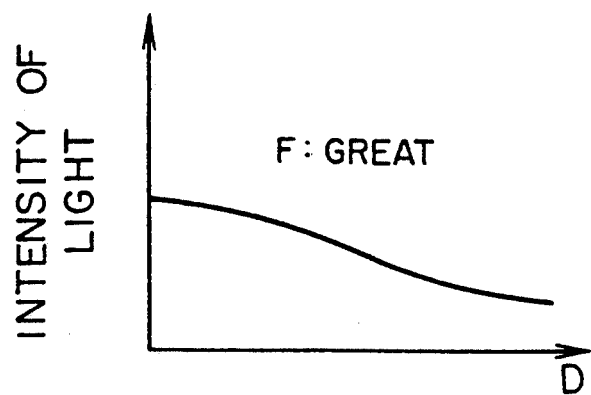
FIG.13(b)
FIG.13(c)
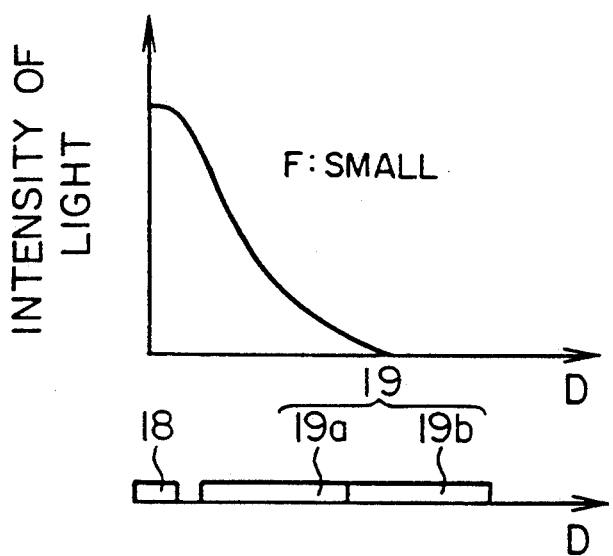
FIG. 14
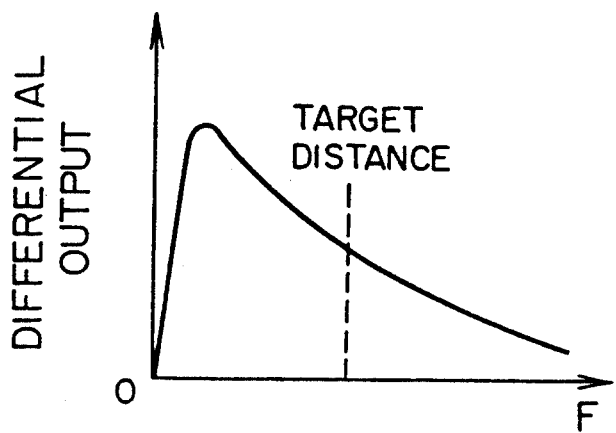

FIG. 25(a)
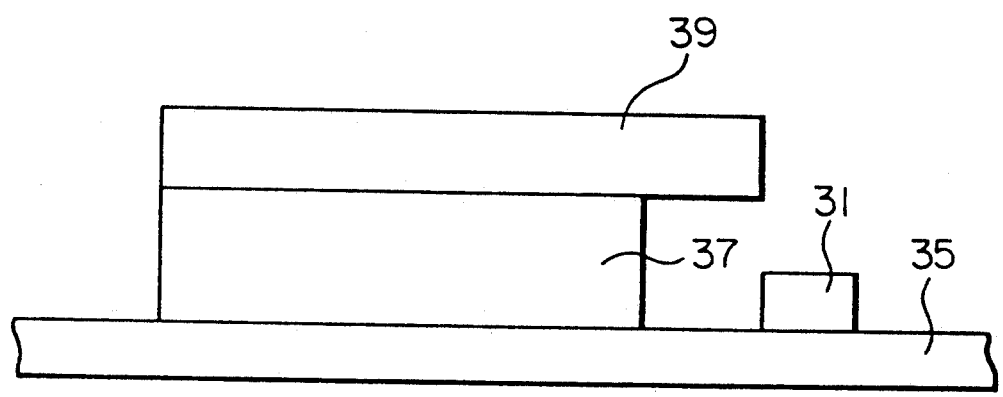
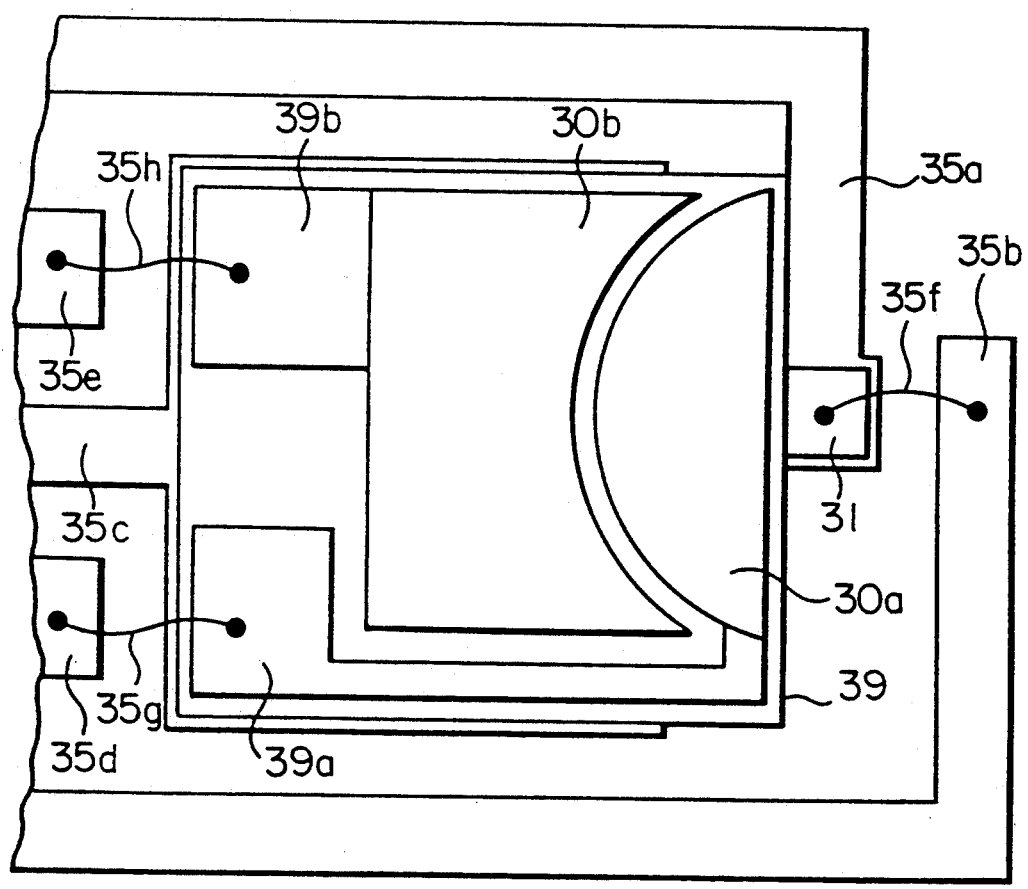
FIG. 25(b)

MAGNETO-OPTICAL RECORDING AND REPRODUCING DISK DEVICE HAVING A BIMORPH TYPE ACTUATOR WITH SPECIFIC STRUCTURES FOR MOUNTING A MAGNETIC HEAD IN OPPOSING TO THE SURFACE OF THE DISK

BACKGROUND OF THE INVENTION

This invention relates to recording and reproducing optical disk devices, and more particularly to magneto-optical disk devices which utilize a magnetic material as the recording medium.

The recording and reproducing optical disk devices of the above type effects recording on the disk as follows: the recording spot on the disk is heated by means of a light (laser) beam to raise the temperature thereat; in addition, a varying exterior magnetic field, namely the biasing magnetic field, is generated by a magnetic head to reverse the direction of the magnetization of the magnetic material on the disk. On the other hand, during the reproducing operation, a light beam of less energy is irradiated on the recording surface to read out the above direction of the magnetization on the disk by means of a magneto-optical effect, such as the magnetic Kerr effect or Faraday effect. This type of optical disk device is finding increasing applications as exterior memory devices of computers, audio disks, etc.

FIG. 1 shows an example of the recording and reproducing optical disk device of the above type. A disk 1 is rotated by a disk driver motor 2. The light beam 4 emitted from the optical head 3 forms a converged light spot 5 on the surface of the disk 4; the diameter of the light spot 5 is generally from about 1.0 to 1.5 micrometers. The optical head 3 comprises the following elements: a light source for emitting the light beam; optical elements for conducting to the surface of the disk 1 the light beam emitted from the light source; optical elements for conducting the light reflected from the disk surface; a photosensor element (a light-sensitive detector) for converting the reflected light into an electrical signal upon receiving the reflected light via the above optical elements for conducting the reflected light; and optical sensors for detecting the focusing and tracking errors of the light spot 5 on the recording surface of the disk 1. The objective lens of the optical head 3 which forms the light spot 5 on the disk 1 is driven in the focusing direction perpendicular to the recording surface of the disk 1 and in the direction perpendicular to the track on the recording surface, such that the focusing and the tracking errors are reduced. The optical head 3 is supported on the base 6, which is supported on the frame of the device via the bearings 7a and 7b to be driven in the radial direction A. Further, on the base 6 is disposed a magnetic head 8 for generating an exterior magnetic field from the side opposite to the side at which the optical head 3 is situated. The recording on the disk 1 is effected by modulating this exterior magnetic field generated by the magnetic head 8.

As shown in detail in FIG. 2 (a) through (c), the distance (designated by $H_1$ through $H_3$, respectively) between the recording surface of the disk 1 and the magnetic head 8 varies as the disk 1 rotates. The strength of the magnetic field generated by the magnetic head 8 is generally from about 100 to 500 Oe at the recording surface; as illustrated in FIG. 3, the magnetic field strength B at the recording surface of the disk 1 (plotted along the ordinate) decreases as the distance H between the surface of the disk 1 and the magnetic head 8 (plotted along the abscissa) increases. The distance H between the recording surface of the disk 1 and the magnetic head 8 varies as the disk 1 rotates, due, for example, to an undulating motion of the recording surface of the disk 1.

The above conventional recording and reproducing optical disk device therefore has the following problems. First, the distance H between the magnetic head 8 and the recording surface of the disk 1 cannot be set as small as is desired if contact of the head 8 with the disk 1 is to be avoided. Thus, the efficiency of the magnetic head 8 in producing a magnetic field at the recording surface of the disk 1 is reduced. Second, the variation of the distance H between the head 8 and the recording surface of the disk 1 results in a variation in the recording characteristics. Third, if the above problems are to be avoided, an extremely high mechanical precision is required of the device.

SUMMARY OF THE INVENTION

It is a primary object of this invention therefore to provide an optical disk recording and reproducing device in which the distance between the magnetic head and the disk is maintained at a constant target value.

In order to maintain the distance between the disk and a recording and reproducing head of the optical disk device, it is necessary to use an actuator. Thus, it is an additional object of this invention to provide a bimorph type actuator which is suited to be used for controlling the distance between the head and the disk of an optical disk recording and reproducing device.

Further, it is essential to detect the distance between the head and the disk for the proper control thereof. Thus, it is still another object of this invention to provide an optical distance detector which is suited to measure the distance between the head and the disk with accuracy.

The optical disk recording and reproducing device according to this invention comprises a magnetic head and an optical head. In the recording, the magnetic head generates a biasing magnetic field at a recording spot on a magneto-optical disk which is heated by a light beam of the optical disk; the reproduction of recorded information is effected by radiating a light beam from the optical head and receiving the light reflected by the recording surface of the magneto-optical disk to read the recorded information therefrom. The magnetic head is mounted on a bimorph type actuator so that the distance between the head and the disk is adjusted; alternatively, it may be mounted on an electromagnetic actuator. A distance detector detects the distance between the magnetic head and the disk; and a driver circuit outputs to the actuator a voltage or current corresponding to the detected distance, so that the error of the distance between the magnetic head and the disk is reduced.

The bimorph type actuator according to this invention comprises a bimorph element that includes a plate-shaped piezoelectric element which may be a ceramic piezoelectric element and a plate-shaped metallic support member. The support member (or shim) has a width which varies with respect to the longitudinal length in such a manner that vibrations of the actuator at undesirable resonance frequencies are suppressed. As a result, the gain or the amount of deflection with respect to the driving voltage is leveled at such resonance frequencies.

Alternatively, the bimorph type actuator according to this invention may comprise a bimorph element on the surface of which a recess is formed to expose a piezoelectric portion thereof. The exposed surface of the piezoelectric portion 7 of the vibrating bimorph element generates a voltage corresponding to the acceleration of the vibration. Thus, the driver circuit of the actuator, which outputs an actuator driving voltage corresponding to the distance between the magneto-optical disk and a recording or reproducing head, determines the frequency of the voltage generated at the recess of the bimorph element. When the frequency comes into the neighborhood of higher resonance frequencies of the actuator, the driver circuit reduces the level of the actuator driving voltage.

The optical distance detector according to this invention comprises a light source, such as a light-emitting diode, and first and second optical detectors, such as photodiodes. The light emitted from the light source is reflected by a surface of an object to be received by the two optical detectors, which output signals corresponding to the amount of light incident thereon. The light-receiving surfaces of the two optical detectors are coplanar and substantially perpendicular to the optical axis of the light source; and the light-receiving surface of the second optical detector is situated farther away from the optical axis of the light source than the light-receiving surface of the first optical detector. The geometric parameters of the light-receiving surfaces of the two optical detectors are selected in such a manner that in the measurement range of the distance, the output of the first optical detector decreases as the measured distance increases while that of the second optical detector increases as the measured distance increases. Thus, the normalized differential output of the two optical detectors, i.e., the ratio of the difference between the outputs of the first and second optical detectors to the sum thereof, is substantially in linear relationship with the measured distance.

In a preferred form, the light-receiving surfaces of the two optical detectors are disposed concentrically around the optical axis of the light source. It is also preferred that the light-receiving surfaces of the two optical detectors are stepped forwards from the light-emitting surface of the light source in the direction of the optical axis of the light source toward the reflective surface of the object, so that separation between the light-emitting surface of the light source and the light-receiving surface of the first optical detector in the direction perpendicular to the optical axis of the light source may be made as small as is desired.

BRIEF DESCRIPTION OF THE DRAWINGS

The novel features which are believed to be characteristic of our invention are set fourth with particularity in the appended claims. Our invention itself, however, both as to its organization and method of operation, together with further objects and advantages thereof, may best be understood from the detailed description of the preferred embodiments, taken in conjunction with the accompanying drawings, in which:

FIGS. 13 (a,b,c) show the relations between the location of the two parts of the light-sensitive element of the optical distance detector of FIG. 11 and the intensity of light incident thereon, in the two cases of great and small measured distance;

FIG. 14 shows the relation between the measured distance and the differential output of the two parts of the light-sensitive element of the optical distance detector of FIG. 11;

FIG. 25 shows a stepped configuration of the photodetectors of an optical distance detector according to this invention, wherein FIG. 25 (a) shows a side elevational view thereof and FIG. 25 (b) shows a plan view thereof;

In the drawings, like reference numerals, except where stated otherwise, represent like or corresponding parts or portions.

DETAILED DESCRIPTION OF THE PREFERRED EMBODIMENTS

In the following, optical disk devices and portions thereof characteristic of this invention are described under respective headings.

Optical Disk Device with a Bimorph Type Actuator

Figure 4:
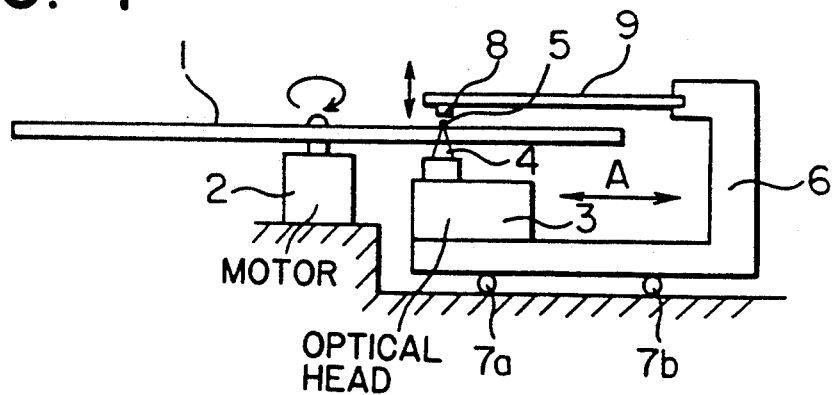
FIG. 4 is a view similar to that of FIG. 1, but showing an optical disk device according to this invention having a bimorph type actuator for the magnetic head thereof.
Figure 5:
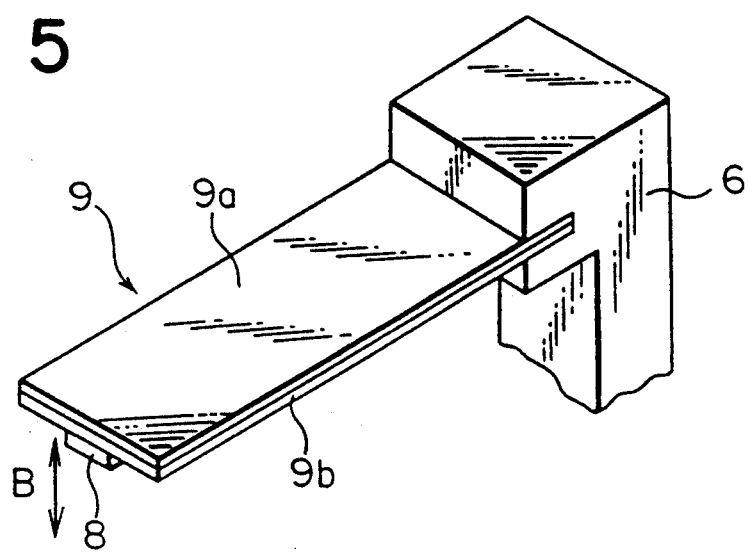
FIG. 5 is a perspective view of the bimorph type actuator of the optical disk device of FIG. 4.
Figure 6:
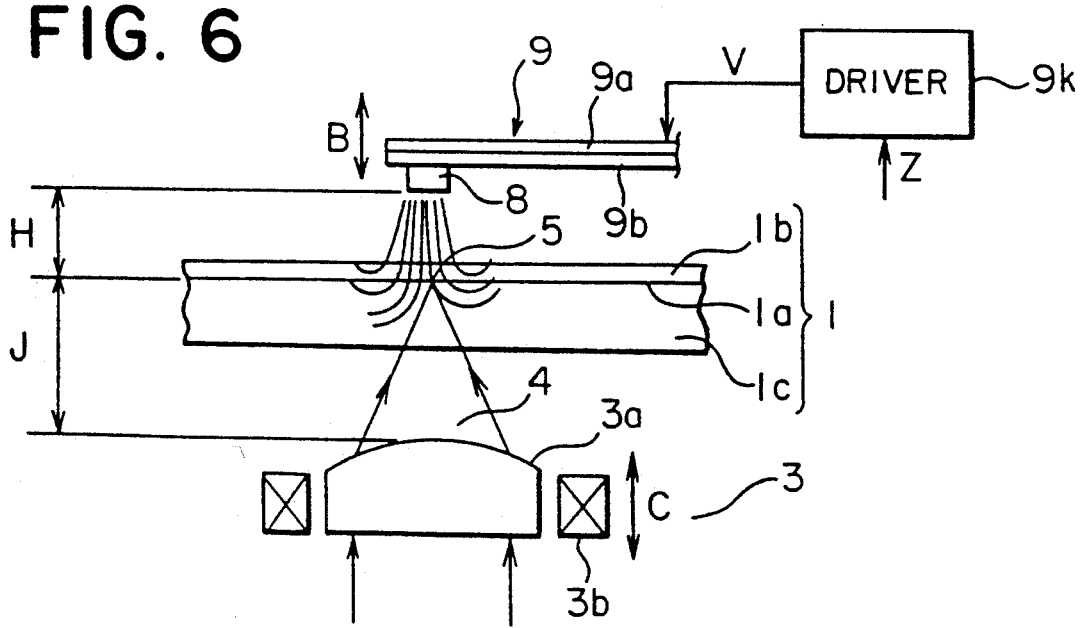
FIG. 6 is an enlarged schematic sectional view of a recording portion of the optical disk recording and reproducing device of FIG. 4 in operation.

Referring now to FIGS. 4 through 6 of the drawings, a first embodiment of a recording and reproducing optical (more precisely magneto-optical) disk device according to this invention is described. This embodiment of optical disk device is characterized by a bimorph type actuator that controls the distance between the magnetic head and the disk. Under this heading, only the overall structure of the device is described.

Figure 1:
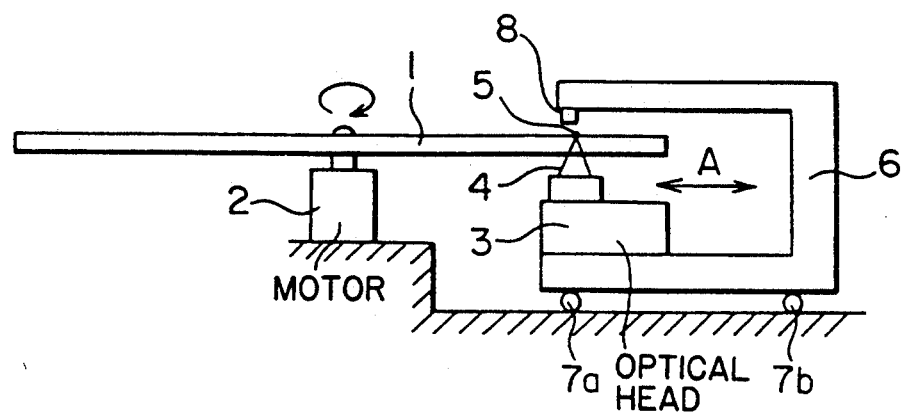
FIG. 1 is a schematic side elevational view of a conventional optical disk recording and reproducing device.
Figure 2A:
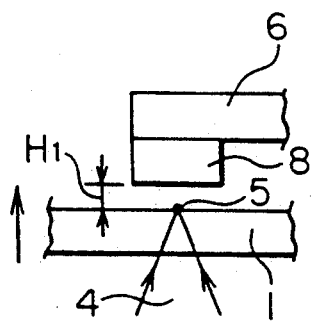
FIG. 2 shows enlarged views of a recording portion of the device of FIG. 1 in operation, in three states in which the distance between the magnetic head is small (FIG. 2 (a)), intermediate (FIG. 2 (b)), and great (FIG. 2 (c))
Figure 2B:
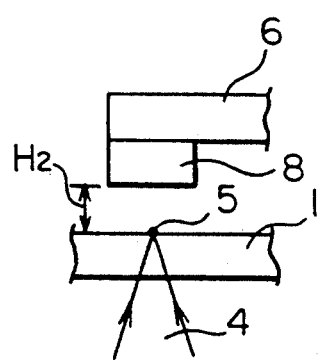
Figure 2C:
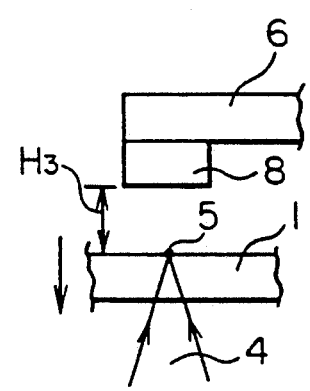
Figure 3:
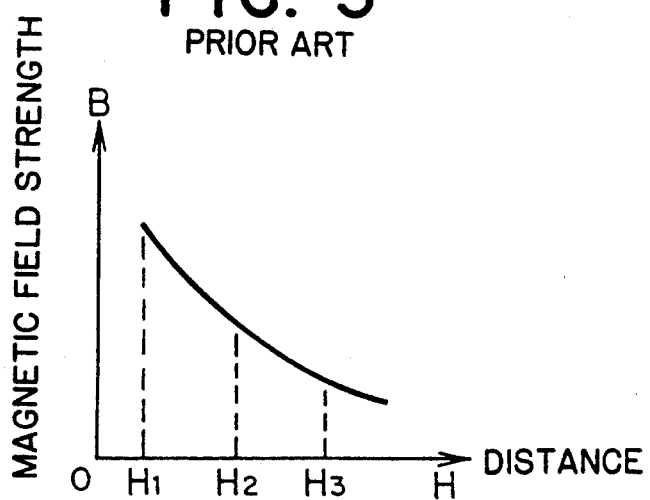
FIG. 3 shows a relation between the distance between the magnetic head and the disk and the magnetic field strength generated by the magnetic head at the recording spot of the disk.

As shown in FIG. 4, this optical disk device is similar to that described above in reference to FIG. 1, except for the following difference. The device comprises a bimorph type actuator 9 mounted at one end thereof to a supporting base 6, and the magnetic head 8 is mounted to the lower surface of the free end portion of a bimorph type actuator 9, as shown in detail in FIG. 5. The actuator 9 consists of a pair of piezoelectric plate-shaped elements 9a and 9b which are coupled together via an electrically conductive plate such that a voltage applied thereacross causes one to expand and the other to contract; thus, the actuator 9 is bent and deflected in the direction B perpendicular to the recording surface 1a of the disk 1 in proportion to the voltage applied thereto. Further details of the structures of bimorph type actuators which are characteristic of this invention are described in detail under the heading "Bimorph Type Actuators" below.

The objective lens 3a in the optical head 3 is driven in the focusing direction C by means of a lens actuator 3b, as shown explicitly in FIG. 6. As well known in the art, the actuator 3b is driven in response to an output signal of an optical distance detector (described below) so that the distance J between the lens 3a and the recording surface 1a on the disk 1 is maintained constant at a predetermined magnitude. The same voltage applied to the actuator 3 is applied to the bimorph type actuator 9 to move the free end thereof in direction B, so that the distance H between the magnetic head 8 and the recording surface 1a of the disk 1 is maintained constant at a predetermined magnitude.

As is well known in the art, optical disk 1 comprises a layer of magnetic material 1b on which the recording of information is effected, and the substrate 1a transparent to the light (laser) beam on which the layer of magnetic material 1b is deposited by a method such as vacuum deposition or sputtering.

Optical Distance Detectors

Under this heading, a few embodiments of optical distance detectors for use with magneto-optical disk recording and reproducing device are described. Further embodiments of optical distance detectors which are suitable for use with the magneto-optical disk recording and reproducing devices are described below under the next heading under which a detailed explanation of the principle of their operation is given.

Figure 7:
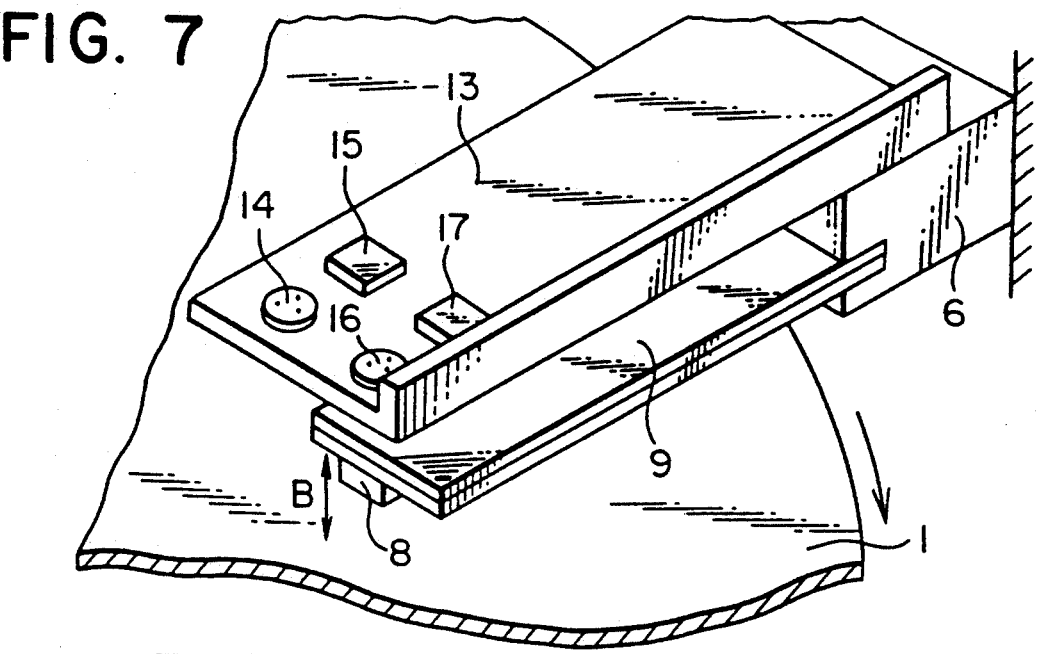
FIG. 7 is a perspective view of an optical distance detector assembly of an optical disk device according to this invention.
Figure 8:
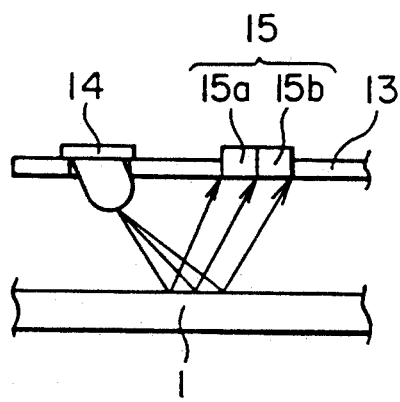
FIGS. 8 and 9 are side elevational views of an optical distance detector of FIG. 7 in operation.
Figure 9:
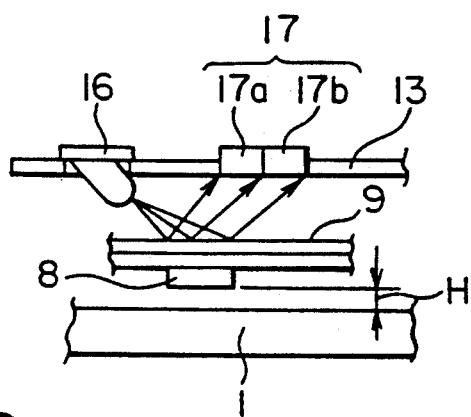

First, referring to FIGS. 7 through 9 of the drawings, an embodiment of the optical distance detector of an optical disk recording and reproducing device according to this invention is described. As shown in FIG. 7, a plate-shaped support member 13 having a L-shaped cross section is mounted at one end thereof to the top surface of the supporting base 6 of the optical disk device. Near the free end of the support member 13 is mounted a pair of optical distance detectors. A first detector of the pair consists of a light-emitting element (i.e. light-emitting diode) 14 and a partitioned light-sensitive element 15 consisting of a pair of light-sensitive detectors (i.e. photodetectors such as photodiodes) 15a and 15b; a second detector consists of a light emitting element 16 and a partitioned light sensitive element 17 consisting of a pair of light-sensitive detector 17a and 17b. The width of the support member 13 is substantially greater than that of the plate-shaped actuator 9 situated thereunder; the first detector consisting of elements 14 and 15 is situated above the surface of the disk 1, while the second detector consisting of elements 16 and 17 is situated above the actuator 9. Hence, as shown in FIG. 9, the light emitted from element 14 of the first detector is reflected on the surface of the disk 1 and received by the element 15; the first detector thus detects the distance between it and the surface of the disk 1. On the other hand, the light emitted from element 16 of the second detector is reflected on the upper surface of the actuator 9 and receives by the element 17; the second detector thus detects the distance between it and the upper surface of the actuator 9. The photosensitive elements 15 and 17 consist of two photodetectors, as shown in FIGS. 8 and 9; the details of the operation of the above first and second optical distance detectors will become clear from the descriptions below under this and the next heading. The distance H between the magnetic head 8 and the surface of the disk 1 can be easily calculated from the distances determined by the above first and second distance detectors.

Figure 10:
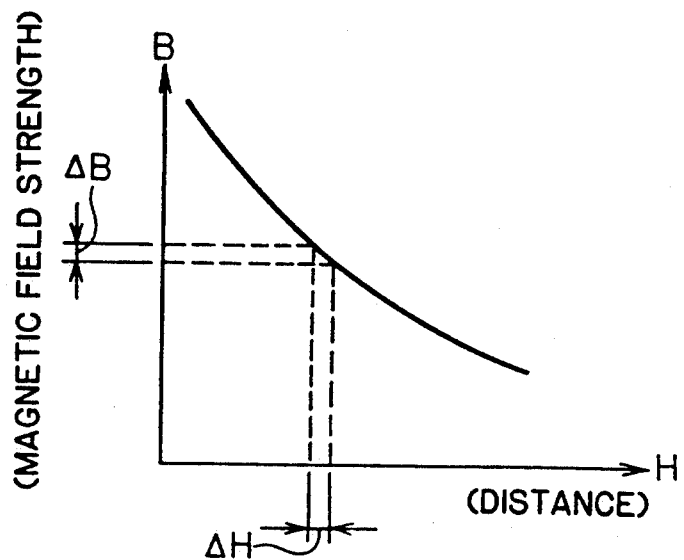
FIG. 10 shows a relation between the variation of the magnetic head distance and the variation in the magnetic field strength generated at the recording spot.

As shown in FIG. 10, the variation $\Delta H$ in the distance H between the magnetic head 8 and the disk 1 results in a variation $\Delta B$ in the magnetic field strength at the recording surface of the disk 1. However, if the actuator 9 is driven in direction B in response to the distance H determined by the distance detector of FIGS. 7 through 9, the variation $\Delta H$ in the distance, and hence the variation in the recording characteristics, can be effectively reduced.

Referring now to FIGS. 11 through 14 of the drawings, another optical distance detector of an optical disk recording and reproducing device and the principle of operation thereof will be described.

Figure 11:
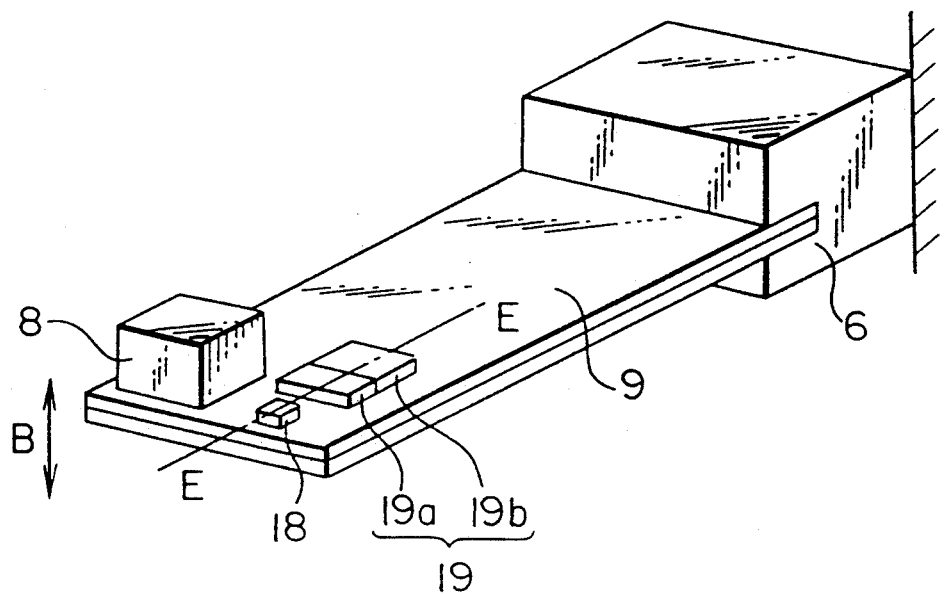
FIG. 11 is a view similar to FIG. 9, but showing another embodiment of an optical distance detector of an optical disk recording and reproducing device according to this invention.
Figure 12:
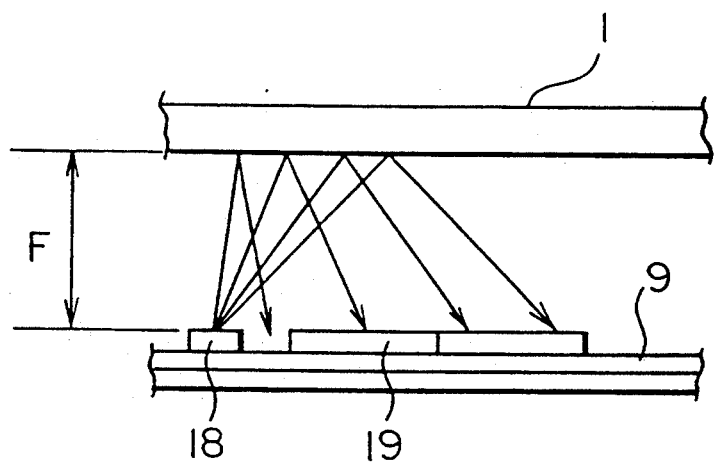
FIG. 12 is a side elevational view of the optical distance detector of FIG. 11 in operation.

As shown in FIG. 12, the disk 1 of the recording and reproducing device according to this embodiment is situated above the bimorph type actuator 9 carrying the magnetic head 8 thereon, with an optical head (not shown) being situated above the disk 1. The optical distance detector comprises a light-emitting element 18 and a partitioned light-sensitive element 19 consisting of a pair of light-sensitive detectors 19a and 19b, which are disposed on the upper surface of the plate-shaped actuator 9 beside the magnetic head 8, as best shown in FIG. 11. As a result, the light emitted from the element 18 is reflected by the lower surface of the disk 1 and received by the element 19, as shown in FIG. 12. A voltage corresponding to the output of the distance detector is applied to the actuator 9 to cause it to bend in the direction B perpendicular to the recording surface of the disk 1, so that the distance between the disk 1 and the magnetic head 8 is maintained constant.

Next, referring to FIGS. 13 and 14, the principle of operation of the optical distance detector comprising the light-emitting element 18 and the partitioned light-sensitive element 19 will be described. FIG. 13 (a) and (b) show the relationship between the distance D along line E—E in FIG. 11 (along which the section shown in FIG. 12 is taken) from the center of the element 18, and the intensity of the reflected light incident on a point on line E—E at a distance D from the center of the element 18. FIG. 13(c) shows the distance D in alignment with the distance D taken along the abscissas of FIG. 13 (a) and (b). FIG. 13 (a) shows the relation in a case where the distance F between the lower surface of the disk 1 and the upper surfaces of the elements 18 and 19 is relatively great. In such case, the intensity of reflected light incident on a point on line E—E at distance D from the center of the element 18 decreases slowly as the distance D increases; thus, the difference in the amounts of light incident on the detectors 19a and 19b is small. On the other hand, when the disk 1 becomes near the surfaces of the element 18 and 19, the intensity of reflected light incident on line E—E peaks markedly at the center of the element 18 and decreases rapidly with the increase in the distance D, as shown in FIG. 13 (b); thus, in such a case, the difference between the amounts of light incident on the cells 19a and 19b becomes greater.

The distance F between the disk and the surfaces of the elements 18 and 19 can be determined from the magnitude of the difference between the output levels of the light-sensitive detectors 19a and 19b. FIG. 14 shows the relation between the distance F (plotted along the abscissa) and the differential output of the partitioned light-sensitive element 19, namely the difference in the outputs of the light-sensitive detectors 19a and 19b (plotted along the ordinate), wherein the target level of distance F is marked by a dotted line. The distance F between the elements 18 and 19 of the distance detector and the disk 1 varies around the target distance thereof in a region in which the differential output decreases monotonously (i.e. substantially linearly) as the distance F increases. Thus, in its variation region, the distance F corresponds to the differential output by a one-to-one relationship. As a result, the distance F, and hence the distance between the magnetic head 8 and the recording surface of the disk 1, are determined uniquely by the differential output of the element 19.

Further Embodiments of Optical Distance Detectors

Further embodiments of optical distance detectors according to this invention will now be described. These optical distance detectors comprise, as a light source, a light-emitting diode, and, as a light-sensitive element, a pair of photodetectors (photodiodes) which detect the amounts of light incident thereon after the light in reflected by a specular surface of an object; they are all characterized in their utilization of the normalized differential output (described under sub-heading (b) below); most of them are characterized in their special geometry of the photodetectors. They are especially suited to be used as a distance detector in a magneto-optical disk recording and reproducing device, although they may be used for other purposes as well. Before embarking on the description thereof, however, the structure and the principle of operation of a typical optical distance detector are reviewed.

(a) Typical Structure of Optical Distance Detector

Figure 15:
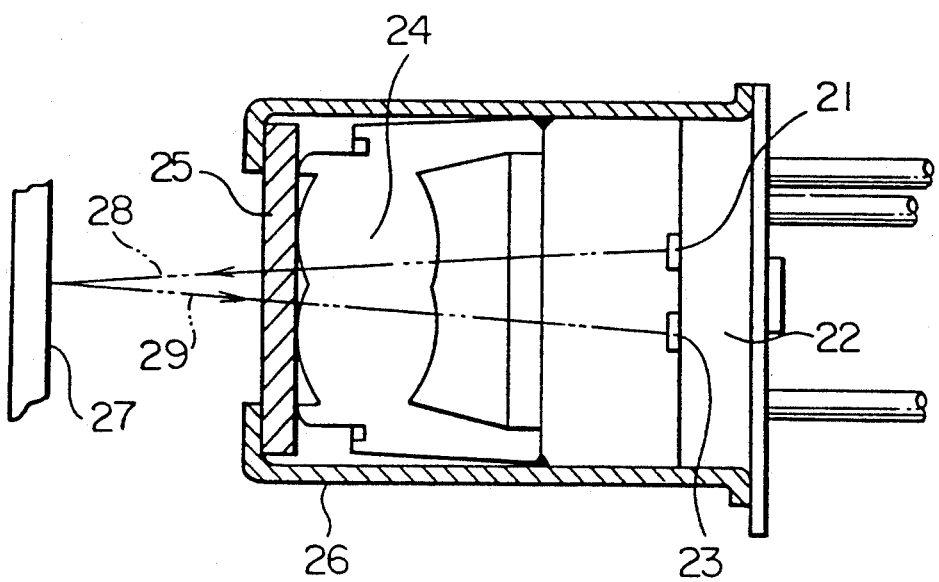
FIG. 15 shows an axial section of a typical optical distance detector.

FIG. 15 shows the structure of a typical optical distance detector. The distance detector comprises a light-emitting diode 21 disposed on a base plate 22, a photo-detector (photodiode) 23 disposed on the same base plate 22, a converging lens 24 including two convex lens portions having distinct optical axes, which convex lens portions converging the emitted and the reflected light, respectively, and a window pane 25 closing the open end of the housing 26 accommodating the diode 21, the photodetector 23, and the converging lens 24.

The operation of the distance detector of FIG. 15 is as follows. The light emitted from the diode 21 is converged by the lens 24 and is radiated from the window pane 25 of the housing 26, to be reflected by a surface of the object 27, such as the recording surface of an optical disk, the distance from which to the distance detector is measured. (The optical axis of the light from the light-emitting diode 21 to the surface of the object 27 is shown by a dot and dash line 28.) The light reflected at the surface of the object 27 enters into the housing 26 via the window pane 25 and is converged by the lens 24 to be received by the photodetector 23. (The optical axis of the light from the surface of the object 27 to the photodetector 23 is shown by a dot and dash line 29.)

Figure 16:
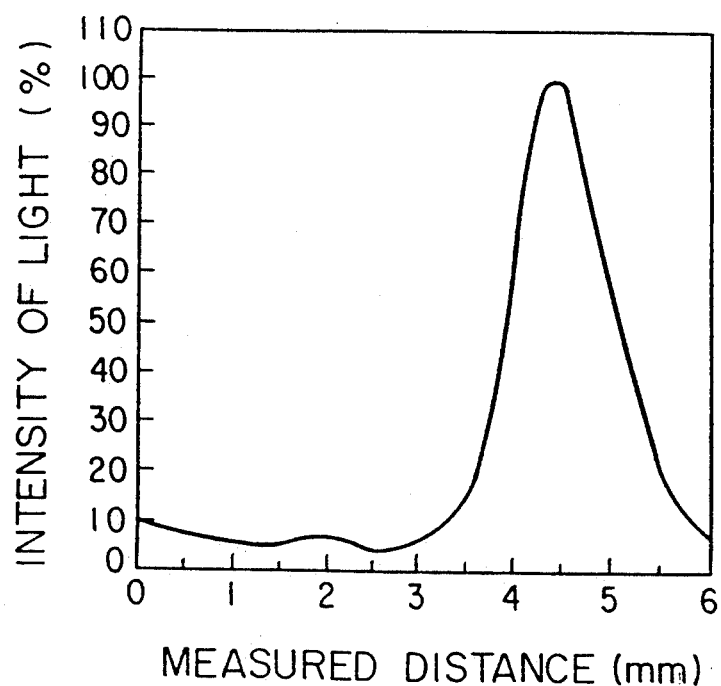
FIG. 16 shows the relation between the measured distance and the intensity of light incident on the photodetector of the optical distance detector of FIG. 15.

The light-emitting diode 21 is driven at a constant output level; hence, the amount of light emitted from the diode 21 is constant. Thus, the amount of light incident on the element 23 is determined by the distance between the object 27 and the distance detector, and the reflectance and the geometric form of the surface of the object 27. In the case where the reflectance and the geometric form of the object 27 do not vary, the amount of light incident on the photodetector 23 is determined solely by the distance between the photodetector and the object 27. FIG. 16 shows the relation between these two factors: the distance between the distance detector and the reflective surface of the object, and the intensity of light incident on the photodetector. As shown in the figure, the intensity of light (plotted along the ordinate) peaks at a distance of about 4.5 mm and falls off thereabove as the distance becomes greater. Thus, as long as the distance to be measured is within a range in which the relation between the measured distance and the intensity of light incident on the photodetector is linear (or more precisely monotonous), the output of the photodetector 23 (which is proportional to the intensity of light incident thereon) corresponds to the measured distance with a one-to-one relationship. Thus, the distance to be measured can be determined uniquely from the output level of the photodetector 23.

The typical optical distance detector as described above, however, has the following disadvantage. Namely, the output of the element 23 depends not only on the distance but also on the reflectance of the surface of the measured object 27. Thus, when the reflectance of the object 27 varies, the distance detector is incapable of determining the distance. As a result, the application of this optical distance detector is limited to the case where the reflectances of the measured objects do not vary from one object to another. The optical distance detectors having partitioned light-sensitive elements described above are improved in this respect; however, they still leave much to be desired. Hence, in the following further embodiments of the optical distance detector according to this invention, which aims at solving the above problem, are described. The optical distance detectors described below are also suited to detect extremely small distances and may be installed with advantage in an optical recording and reproducing disk device for determining the distance between the disk and the optical or magnetic head thereof.

(b) Fundamental Structure and Organization

Referring now to FIGS. 17 through 22 of the drawings, an embodiment of a distance detector is described, which shows the fundamental structure and organization of the optical distance detectors according to the principle of this invention. The description of the fundamental structure and organization under this sub-heading (b) applies to the embodiments described below under sub-headings (c) through (e), except where it is stated otherwise or it is apparent from the description that the fundamental structure and organization do not apply to that particular embodiment.

Figure 17:
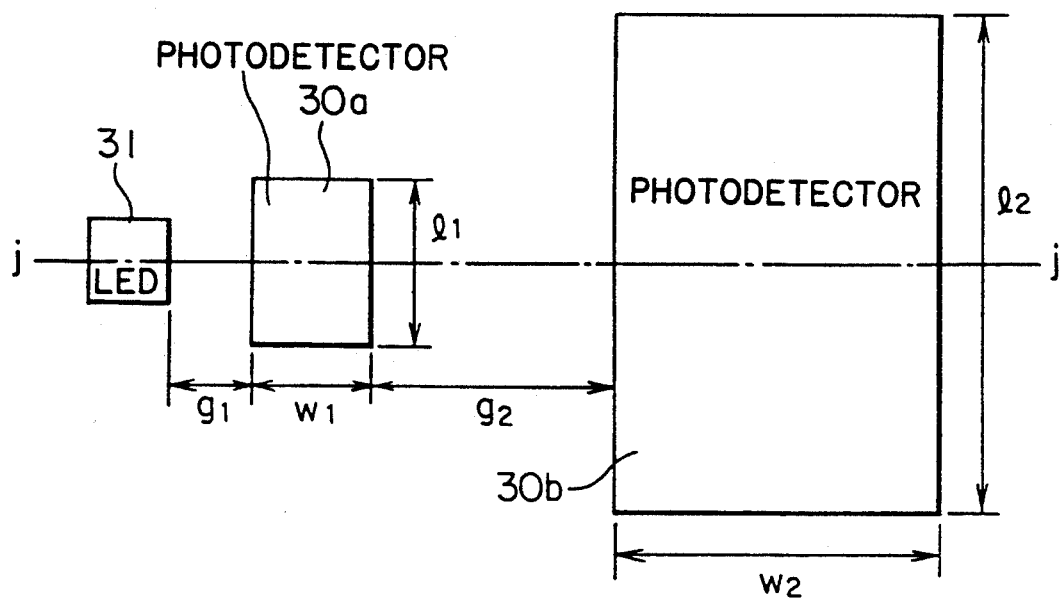
FIG. 17 shows a basic geometry of light-emitting diode and the photodetectors of an optical distance detector according to an embodiment of this invention.

As shown in FIG. 17, the optical distance detector comprises a light-emitting diode 31 constituting the light source, and first and second photodetectors (photodiodes) 30a and 30b. According to this embodiment, the light-emitting diode 31 is disposed on the same plane on which the photodetectors 30a and 30b are disposed, which plane is referred to as the detector plane hereinafter. The second photodetector 30b, which lies farther away from the light-emitting diode 31 than the first photodetector 30a, has a light-receiving area greater than that of the first photodetector 30a for reasons which will become clear below.

The operation of the distance detector of FIG. 17 is as follows. The light-emitting diode 31 is energized at a constant output level. Thus, the rectangular upper surface of the diode 31, which forms substantially a completely diffusive light-emitting surface, emits light in all directions almost in equal intensity. Let us suppose that the distance between an object having a specular reflective surface and the detector plane is to be measured, the object lying above and parallel to the detector plane. Then the light emitted from the diode 31 is reflected by the specular reflective surface of the object and received by the first and second photodetectors 30a and 30b.

Figure 18A:
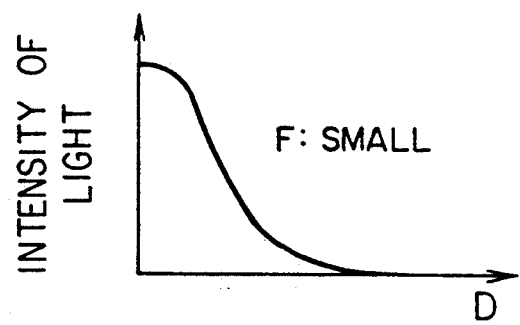
FIGS. 18 (a,b,c) show the relations between the location of the photodetectors of FIG. 17 and the intensity of light incident thereon, in the two cases of great and small measured distance.
Figure 18B:
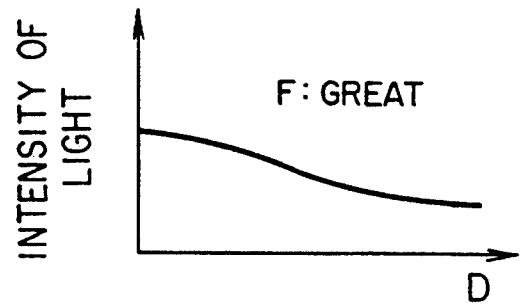
Figure 18C:
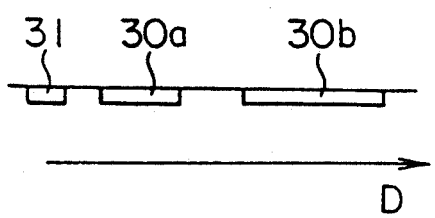

FIG. 18 shows the relationship between the position on line j—j in FIG. 17 and the intensity of light incident thereon. Namely, the abscissas of FIG. 18 (a) and (b) are the distance D from the center of the light-emitting surface of the diode 31 along the line j—j in FIG. 17, which distance D is shown in alignment therewith at the bottom row (c) of the same figure; the ordinates of FIG. 18 (a) and (b) are the intensity of light which is incident on a point on line j—j at distance D from the center of the diode 31. FIG. 18 (a) shows the relationship in a case where the distance F between the surface of the object and the detector plane is relatively small. On the other hand, FIG. 18 (b) shows the relationship in a case where the distance F is relatively great. As shown in FIG. 18 (a), when the distance F is small, the intensity of incident light has a marked peak at the center of the light-emitting diode 31 and falls off rapidly as the distance F increases. On the other hand, when the distance F is great, the peak of the incident light at the center of the diode 31 becomes less marked, the distribution of the intensity of incident light spreading over the distance D with a slow decreasing rate.

FIG. 18 shows only two representative cases (a) and (b). However, it will be apparent from the figure that as the distance F becomes smaller, the distribution of the intensity of light becomes more and more concentrated at the center (i.e. the point where distance D is equal to zero) and the height of the peak becomes increasingly higher.

Thus, if the intensity of light incident on a fixed point at a constant distance D from the center of the diode 31 is observed, it will first increase and then decrease as the distance F increases. Namely, the relationship between the distance F and the intensity of light on a fixed point has a form similar to that shown in FIG. 17, in which the measured distance plotted along the horizontal axis corresponds to the distance F. The intensity of light incident on a fixed point increases as the distance F increases until it reaches a peak or maximum; thereafter it decreases as the distance F increases. The relation between the distance F and the intensity of incident light, however, is different from one point to another. Namely, as the distance D becomes greater, the peak of the intensity of light is reached at an increasingly larger value of the distance F and the height of the peak becomes lower.

Figure 19:
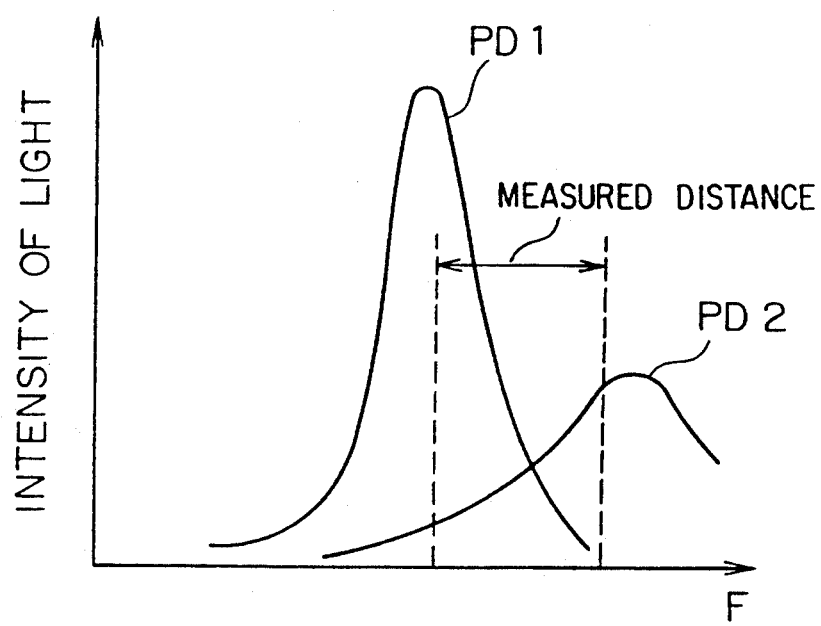
FIG. 19 shows the relations of the measured distance and the intensity of light incident on the first and the second photodetector of FIG. 17, respectively.

FIG. 19 shows the relation between the above distance F (the abscissa) and the intensity of light the ordinate) incident on the upper surface of the photodetectors 30a and 30b, wherein the curves PD1 and PD2 show the intensities of light incident on photodetectors 30a and 30b, respectively. Since the first photodetector 30a is situated nearer to the light source (i.e. the light-emitting diode 31), the intensity of light incident on it has a peak when the distance F is relatively small and falls off thereafter as the distance F increases, as shown by curve PD1. The second photodetector 30b, on the other hand, is situated farther away from the light source; thus, the intensity of light incident on it has a lower peak which is reached when the distance F is relatively great, as shown by curve PD2. The parameters of the distance detector of FIG. 17, such as the separations $g_1$ and $g_2$ between the diode 31 and the photodetector 30a and between the photodetectors 30a and 30b, respectively, or the widths $w_1$ and $w_2$ of the photodetectors 30a and 30b, are selected in such a way that the variation range of the distance F to be measured by the distance detector lies between the peaks of the incident light intensity curves PD1 and PD2, as shown by a double-headed arrow in FIG. 19. Thus, within the measured distance range, the intensity of light incident on the first detector 30a decreases as the distance F increases, while the intensity of light incident on the second detector 30b increases as the distance F increases. It is a feature of this invention that the geometric parameters of the first and second photodetectors are selected in such a manner that the range of variation of the measured distance F is contained in an interval between the peaks of the intensity of light incident on the first and second photodetectors 30a and 30b.

Figure 20:
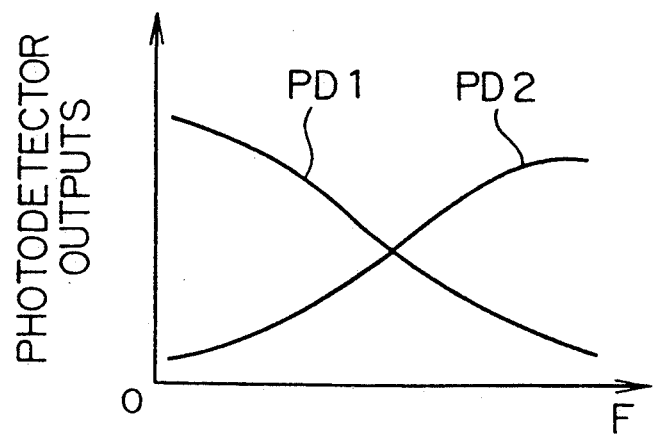
FIG. 20 shows the relations of the measured distance and the outputs of the photodetectors of FIG. 17 in the measurement range thereof.
Figure 21:
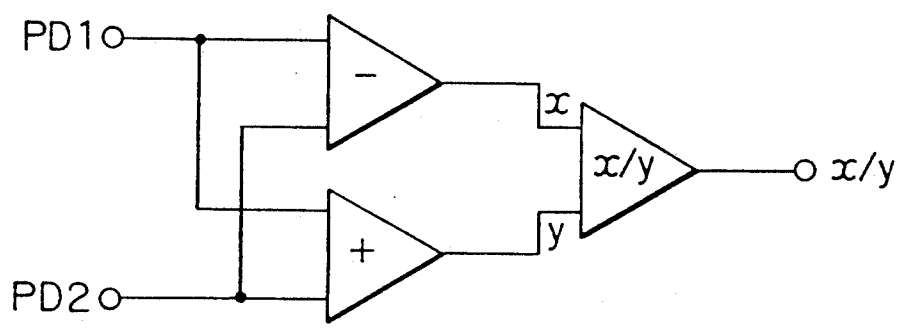
FIG. 21 is a schematic circuit diagram for computing a normalized differential output of the two photodetectors of the optical distance detector of FIG. 17 according to this invention.

FIG. 20 shows the relationship between the distance F and the output levels of the photodetectors 30a and 30b within the variation range of the measured distance F. Since the light-receiving surface of the second photodetector 30b has an area greater than that of the first photodetector 30a to compensate for the decline of the intensity of incident light, the level of the output PD2 of the second photodetector 30b is substantially the same as that of the output PD1 of the first photodetector. The output PD1 of the first photodetector 30a nearer to the light source decreases substantially linearly (monotonically) in the variation range of the measured distance F, while the output PD2 of the second photodetector 30b farther away from the light source increases substantially linearly in the variation range of the measured distance F.

The distance F between the surface of the object and the detector plane is determined from the normalized differential output of the first and second photodetectors 30a and 30b, as described in the following. Namely, by means of an electric circuit schematically shown in FIG. 21, the difference x and the sum y of the outputs PD1 and PD2 of the first and second photodetectors 30a and 30b are computed as follows:

$$x = PD1 - PD2,$$

$$y = PD1 + PD2.$$

Then, the differential output x of the two photodetectors 30a and 30b is normalized by taking the ratio of it with regard to y:

$$x/y = (PD1 - PD2)/(PD1 + PD2).$$

As noted above, the output PD1 decreases montonically as the distance F increases in the range of variation of the measured distance, while the output PD2 increases monotonically as the distance F increases in the same range. Thus, the value of the differential output x decreases substantially linearly as the distance F increases. Further, this differential output x is normalized with respect to the sum y of the two outputs PD1 and PD2 by taking the ratio x/y. Thanks to the normalization with respect to the sum y of the two outputs PD1 and PD2, the level of this normalized differential output x/y of the two photodetectors 30a and 30b is not affected by the variation in the reflectance of the specular surface of the object at which the light emitted from the diode 31 is reflected. Thus, the distance F can be determined by utilizing the relation between the distance F and the normalized differential output that is shown in FIG. 22.

Figure 22:
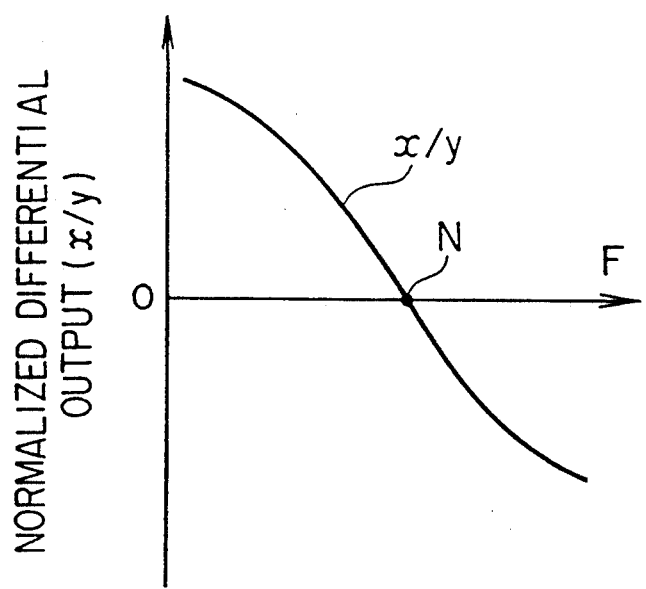
FIG. 22 shows the relation between the measured distance and the normalized differential output computer by the circuit of FIG. 21.

The normalized differential output x/y becomes equal to zero, i.e., has a zero crossing point N as shown in FIG. 22, when the outputs PD1 and PD2 of the first and second photodetectors become equal. If the distance of F at the zero-crossing point N in FIG. 22 is equal to the target distance of F, then the normalized differential output x/y itself may be used as the error signal of the distance F with respect to the target distance. Thus, it is preferred that the parameters of the diode 31 and photodetectors 30a and 30b, such as the separations $g_1$ and $g_2$ and the dimensions of photodetectors 30a and 30b $w_1$, $l_1$, $w_2$, and $l_2$, shown in FIG. 17, are selected in such a way that the distance of F at the above zero crossing point N becomes equal to the target distance of F. Since the normalized differential output x/y has a zero crossing point where the outputs PD1 and PD2 become equal, the zero crossing point N can be set substantially arbitrarily at any desired position by varying the above parameters of the diode 31 and the photodetectors 31a and 31b. For example, if the separation $g_2$ between the two photodetectors 30a and 30b is made smaller, the peak of the intensity of light incident on the second photodetector 30b, i.e., the peak of the curve PD2 in FIG. 19, moves toward the left in the figure. Hence, the output of the second photodetector 30b, shown by the curve PD2 in FIG. 20, increases more rapidly in the region in which the distance F is small. Thus, the zero crossing distance becomes smaller, i.e., the position of the zero crossing point N is moved toward left in FIG. 22. Conversely, if the separation $g_2$ is made greater, the zero crossing distance of F becomes greater.

Of course, the position of the zero crossing point N, i.e., the zero crossing distance of F, can just as well be changed by varying the ratio of the areas of the light-receiving surfaces of the two photodetectors 30a and 30b. It is noted in this connection that if the ratio of the two areas is equal to unity, i.e., if the two areas are equal to each other, the amount of light incident on the first photodetector 30a is always greater than that incident on the second photodetector 30b. As a result, the zero crossing point N is removed to infinity. On the other hand, when the area of the second photodetector 30b increases and the ratio of the area of the second photodetector 30b to that of the first photodetector 30a increases above unity, the zero crossing distance becomes smaller. Thus, in order to make the zero crossing distance equal to the target distance, it is necessary to select the ratio of the areas of the second photodetector 30b to the first 30a at a value greater than unity, i.e., to make the area of the second photodetector 30b greater than that of the first 30a.

(c) Concentric Geometry of the Photodetectors

Figure 23:
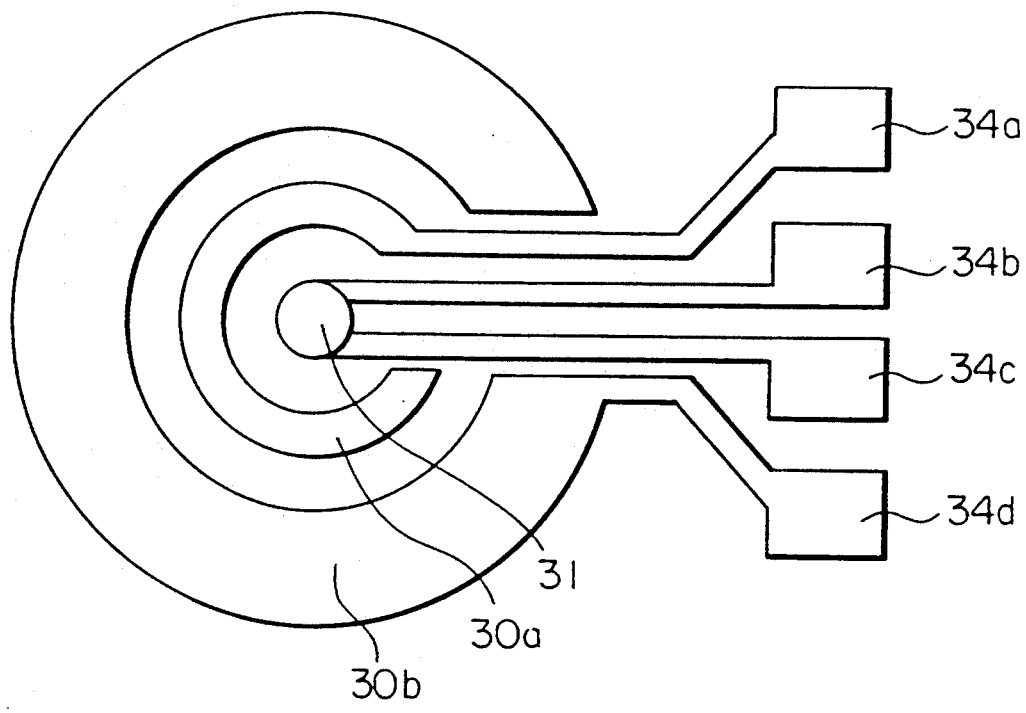
FIGS. 23 and 24 are plan views of the concentric arrangements of photodetectors of an optical distance detector according to this invention.

FIG. 23 shows another embodiment of an optical distance detector which is fundamentally similar to the above detector shown in FIG. 17 but in which the geometry of the photodetectors is adapted to the radially symmetric distribution of the light emitted from the light-emitting diode. Namely, the distribution of the light emitted from the light-emitting diode 31 is substantially rotationally symmetric with respect to the axis of the light-emitting diode 31 which pass through the center of the diode 31 at right angles with the surface thereof. Thus, for the purpose of enhancing the accuracy of measurement, the most efficient geometry of the light-receiving surfaces of the first and second photodetectors is that in which annular surfaces of the photodetectors are disposed around the light-emitting diode 31 in concentric relationship. With such a geometry, the concentric annular surfaces of the two photodetectors receive the reflected light at locations at which the intensity of incident light is substantially equal and uniform (i.e., take a single value).

Thus, the first and second photodetectors 30a and 30b of the embodiment shown in FIG. 23 have substantially the forms of annuli concentric with the disk-shaped light-emitting diode 31 disposed at the central portion thereof. Across the light-emitting diode 31 are attached a pair of electrodes 34b and 34c, which extends through the cut-out portions formed in the annular photodetectors 30a and 30b. An electrode 34a attached to the first photodetector 30a extends through the cut-out portion of the annular second photodetector 30b, to which an electrode 34d is attached. Thus, the cut-out portions of the annular photodetectors 30a and 30b of this embodiment serve for the purpose of leading out the electrodes 34a through 34d.

Figure 24:
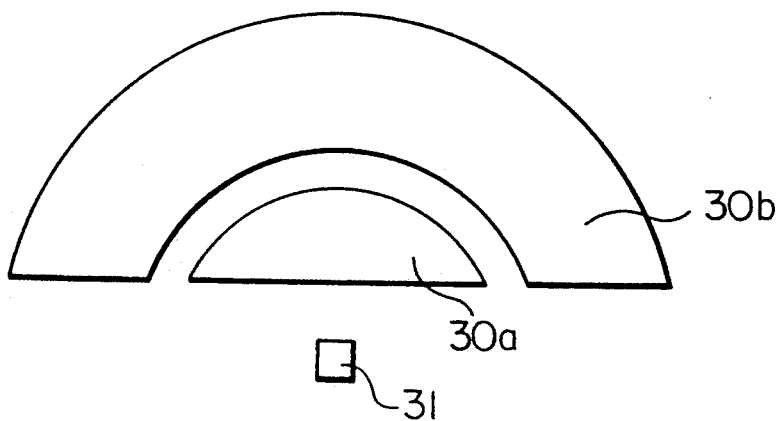

FIG. 24 shows still another embodiment having a fundamentally concentric geometry of the light-emitting diode and the two photodetectors. The first photodetector 30a has the form of a segment of a disk the center of which coincides with that of the light-emitting diode 31, the segment being cut off by a chord opposing a side of the rectangular light-emitting diode 31. The second photodetector 30b has the form of a segment of an annulus which is concentric with the segmental disk-shaped first photodetector 30a, the segment being cut from the annulus by a line obtained by producing the chord that bounds the segment of the first photodetector 30a. Thus, the inner and outer arcs that bound the segment of annulus of the second photodetector 30b are centered around the light-emitting diode 31. The efficiency of receiving the reflected light is reduced in this geometry of the photodetectors 30a and 30b, compared with the case of FIG. 23. However, in the case of the geometry of FIG. 24, the light-emitting diode 31 and the photodetectors 30a and 30b can be produced as separated chips which are mounted later on a substrate, which makes the production thereof easier.

(d) Stepped Configuration of the Photodetectors

In the case where the distance to be measured is small and the variation range of the measured distance is limited around a small distance, the areas of the first and second photodetectors, especially that of the first photodetector, must be made small, and the separations between the light-emitting diode and the first and second photodetectors must be reduced in order to attain enough precision in the measurement. In principle, these reductions of separations and surface areas of optical elements can be accomplished in a coplanar geometry discussed above. However, since these optical elements must be electrically isolated from each other, it is difficult to reduce the separations therebetween under a certain limit in the case of a coplanar geometry of the light-emitting diode and the photodetectors.

Figure 26:
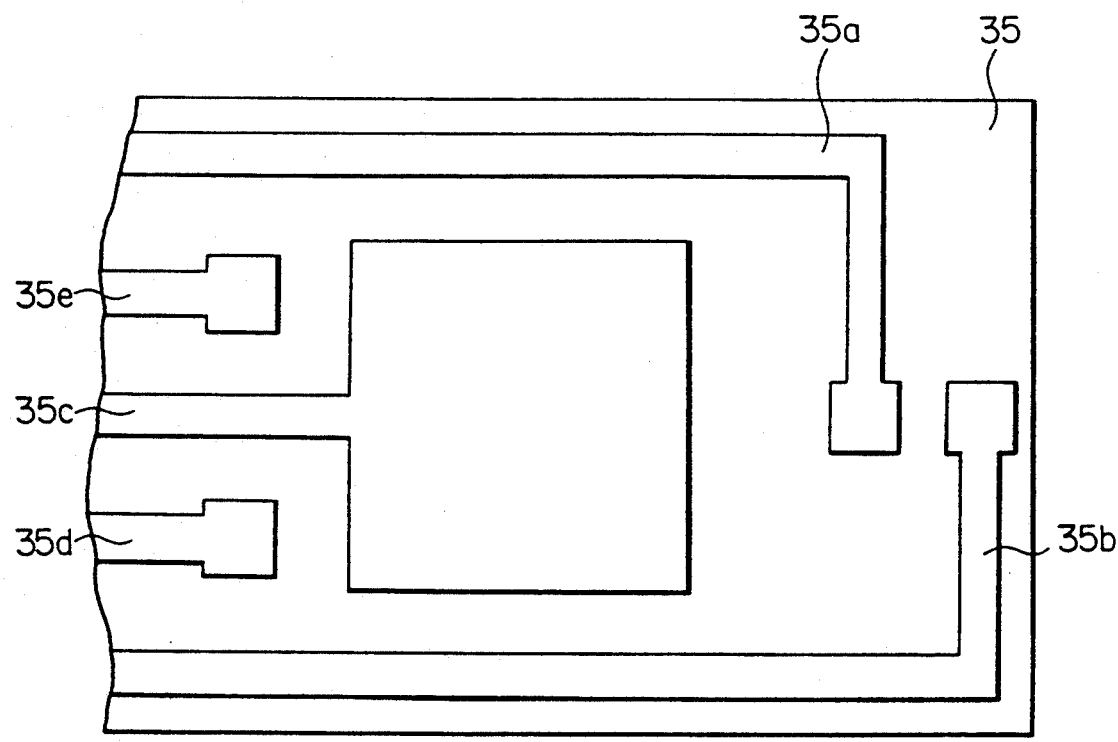
FIG. 26 is a plan view of the substrate of the optical distance detector of FIG. 25.

Thus, FIG. 25 shows a vertically stepped configuration of the photodetectors which is suited to measure a small distance, FIG. 25 (a) and (b) are a side elevational view and plan view of the light-emitting diode and the photodetectors, respectively. According to this embodiment, the photodetector chip 39 carrying the first and second photodetectors 30a and 30b on the upper surface thereof is mounted on a printed circuit board or substrate 35 via an electrically conductive plate-shaped spacer 37. The first light-emitting diode 31 is mounted directly on the substrate 35. As shown in FIG. 26, the circuit board 35 carries thereon a printed circuit comprising the following pattern of electrical interconnections: a pair of leads 35a and 35b to be coupled to the lower and upper (light-emitting) surface of the light-emitting diode 31, respectively, a lead 35c having an enlarged rectangular end portion that is to be coupled to the lower surface of the photodetector chip 39 which constitutes the cathode of the photodetectors 30a and 30b, and a pair of leads 35d and 35e to be coupled to the anodes (i.e., upper surfaces) of the photodetectors 30a and 30b, respectively. On the other hand, the photodetector chip 39 comprises on the upper surface thereof bonding pads 39a and 39b coupled to the anodes of the first and second photodetectors 30a and 30b, respectively. As shown in FIG. 25 (b), the following pairs are electrically coupled to each other by a bonding wire. The upper or light-emitting surface of the diode 31 is coupled to the lead 35b by a bonding wire 35f, the bonding pad 39a for the anode of the first photodetector 30a is coupled to the lead 35d by a bonding wire 35g, and the bonding pad 39b for the anode of the second photodetector 30b is coupled to the lead 35e by a bonding wire 35h. The connection between the lower surface of the diode 31 and the lead 35a, the connection between the photodetector chip 39 and the electrically conductive spacer 37, and the connection between the spacer 37 and the lead 35c are made by means of an electrically conductive adhesive material.

In the above structure, the thickness of the plate-shaped spacer 37 is selected at a dimension greater than the thickness of the light-emitting diode 31. Furthermore, the side of the rectangular spacer 37 opposing the light-emitting diode 31 recedes from the side of the chip 39 thereabove which likewise opposes the diode 31. As a result, the separation between the opposing side surfaces of the spacer 37 and the diode 31 can be made as great as is desirable, as is apparent from FIG. 25 (a). Thus, even if there is some extrusion of electrically conductive adhesive material in the assembling process, there is no danger of an occurrence of short circuit between the leads 35c for the cathode of the photodetectors and the lead 35a for the lower surface of the diode 31. Further, between the light-emitting surface of the diode 31 and the light receiving surfaces of the photodetector chip 19 is formed a vertical drop in the direction of the optical axis thereof, i.e., in the direction perpendicular to the surface of the diode 31 or photodetectors 30a and 30b. Since the thickness of the spacer 37 is greater than the thickness of the diode 31, the vertical drop is greater than the thickness of the photodetector chip 19.

Figure 27:
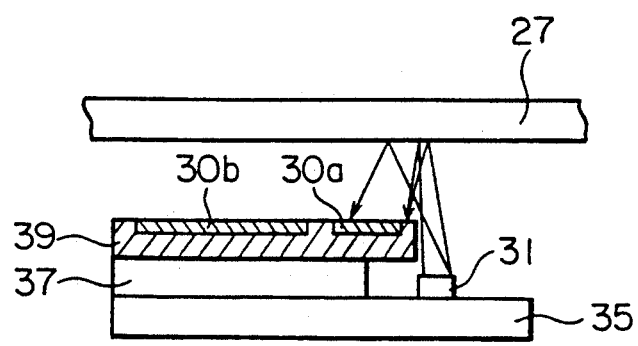
FIG. 27 is a side elevational view of the detector of FIG. 26 in operation.

The method of operation of the photodetector configuration shown in FIGS. 25 and 26 is as follows. As shown in FIG. 27, the light emitted from the diode 31 is reflected by the opposing specular surface of an object 27 and the reflected light is received by the photodetectors 30a and 30b. Since the spacer 37 has a thickness greater than that of the diode 31 (i.e., the vertical drop of the light-emitting surface with respect to the light-receiving surfaces of the photodetectors is greater than the thickness of the light-emitting diode 31), the separation between the light-emitting diode 31 and the photodetector chip 39 can be made as small as is desired, without incurring the danger of short circuit between the leads 35a and 35c or between the spacer 37 and the lead 35a. Thus, the light-emitting surface of the diode 31 and the light-receiving surface of the photodetector chip 39 (especially the light-receiving surface of the photodetector 30a) can be made sufficiently near to each other, in their horizontal positions. If necessary, the projections of the light-emitting and light-receiving surfaces to a horizontal plane (the projections being made on a horizontal plane in a direction parallel to their optical axes that are perpendicular to the light-emitting or light-receiving surface thereof) may partially overlap each other. As a result, the distance detector according to this embodiment is capable of measuring extremely small distances with accuracy.

Figure 28A:
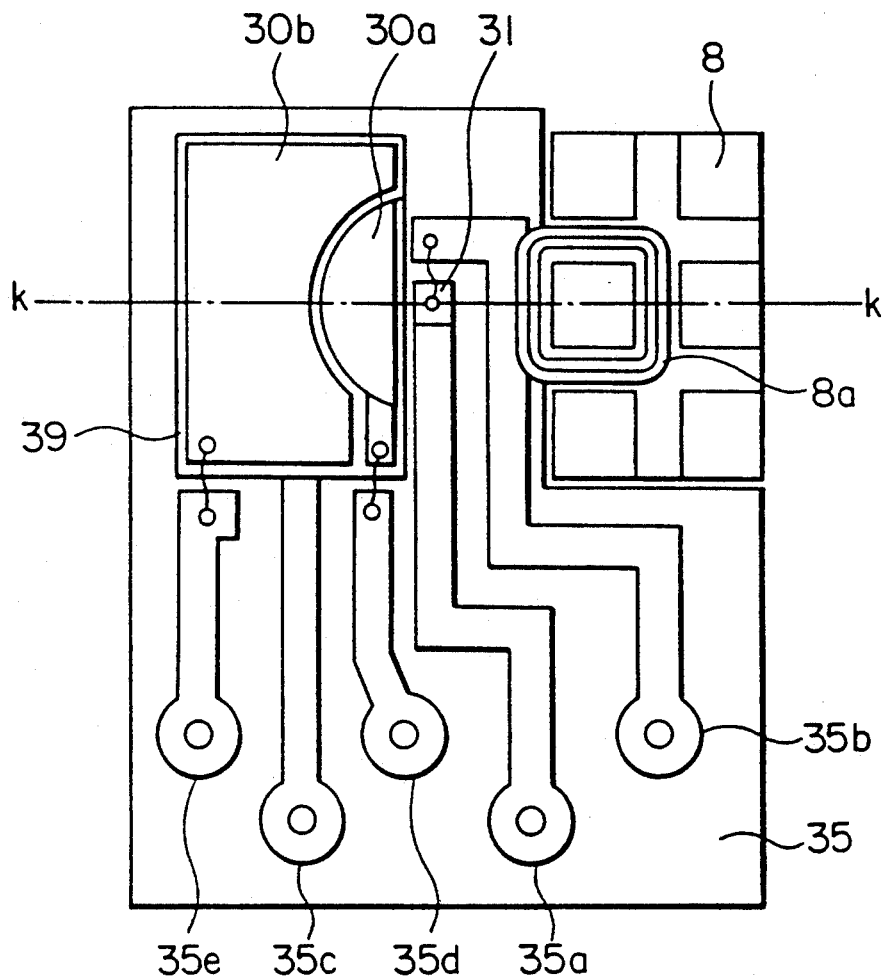
FIG. 28 shows a portion of an optical disk device in which an optical distance detector similar to that of FIG. 26 is installed, wherein FIG. 28 (a) is a plan view thereof while FIG. 28 (b) is a side elevational sectional view thereof.
Figure 28B:
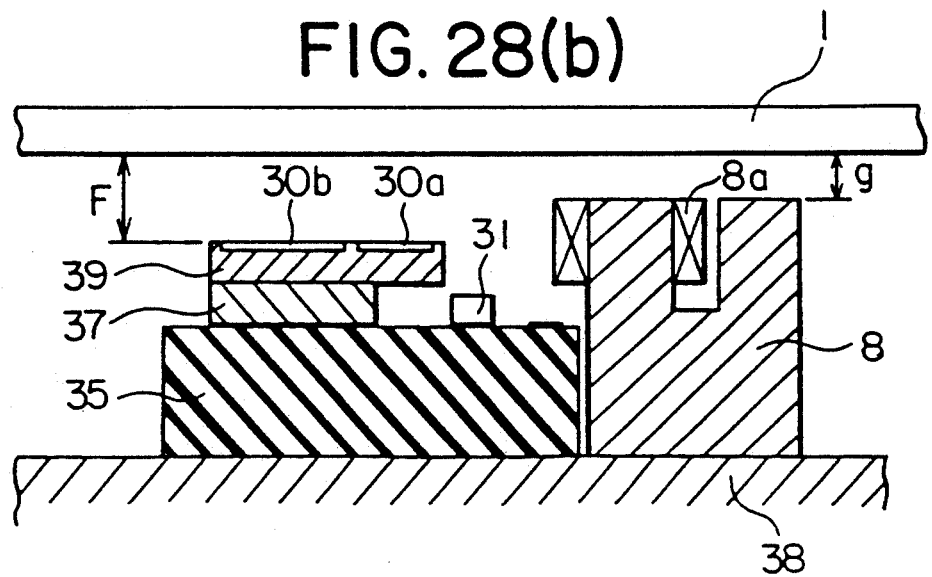

FIG. 28 shows an embodiment wherein an optical distance detector having a structure substantially identical to that of FIGS. 25 through 27 is installed in a magneto-optical disk device for the purpose of controlling the distance between its magnetic head 8 and the optical disk 1. FIG. 28 (a) is a plan view of the magnetic head 8 and the optical distance detector. The optical distance detector includes a substrate 35 carrying the printed circuit comprising the leads 35a through 35e coupled to electrodes of the light-emitting diode 31 and the photodetectors 30a and 30b thereon. FIG. 28 (b) shows a vertical cross section thereof along line k—k in FIG. 28 (a). As shown in FIG. 28 (b), the magnetic head 8 and the distance detector on the substrate 35 are mounted on a support member 38 which constitutes an actuator for adjusting the separation g between the magnetic head 8 and the optical disk 1.

The operation of the assembly shown in FIG. 28 is as follows. The actuator constituted by the member 28 is driven in response to the distance F between the light-receiving surface of the photodetector chip 39 and the optical disk 1. Thus, as discussed above, it is preferred that the geometric parameters of the diode 31 and the photodetectors 30a and 30b (such as the separations therebetween and the areas of the two photodetectors 30a and 30b) are selected in such a way that the following condition is satisfied. Namely, when the separation g is equal to the target value thereof, the normalized differential output x/y of the first and second photodetectors 30a and 30b vanishes. In this manner, the normalized differential output x/y can be used as the error signal in the control of the separation g to the target value thereof.

The reason that the separation g between the magnetic head 8 and the disk 1 must be controlled by means of an actuator in a magneto-optical disk device is as follows. Commonly, a separation of a few micrometers is formed by means of an air cushion formed between the magnetic head and the magnetic recording medium of a magnetic recording and reproducing device. However, the strong point of the magneto-optical disk device is its immunity to dust. Thus, if this advantage of the magneto-optical disk device is to be preserved, the separation between the magnetic head and the disk must be controlled within a range of from a few tens of micrometers to a few hundreds of micrometers. Thus, in the case of magneto-optical disk device, the air floating method is of no avail. Consequently, it is necessary to detect the separation between the magnetic head and the disk by a distance detector and control it in response to the output to the distance detector. Further, the distance detector must be small-sized and light-weight to be used with an magneto-optical disk recording and reproducing device. The optical distance detector according to the above embodiment satisfies these requirements.

(e) Stepped Concentric Configurations of the Photodetectors

As discussed above in connection with the configuration of FIG. 23, the distribution of the light emitted from the light-emitting diode is substantially radially symmetric, i.e., rotationally symmetric with respect to the central axis of the light-emitting diode. Hence, concentric configuration of the first and second photodetectors centered around the light-emitting diode is most efficient and accurate in determining the distance from the amounts of light incident thereon. However, various technical difficulties accompany such configuration of the photodetectors mounted on the same chip or substrate on which the light-emitting diode is mounted. The difficulties become greater if the separations between the optical elements or areas of the photodetectors are to be made smaller for the purpose of determining small distances with enough precision. Thus, in the following, embodiments having stepped concentric configuration will be described whereby the electrical connections can be made easily and measurement of small distance can be made accurately and efficiently.

Figure 29A:
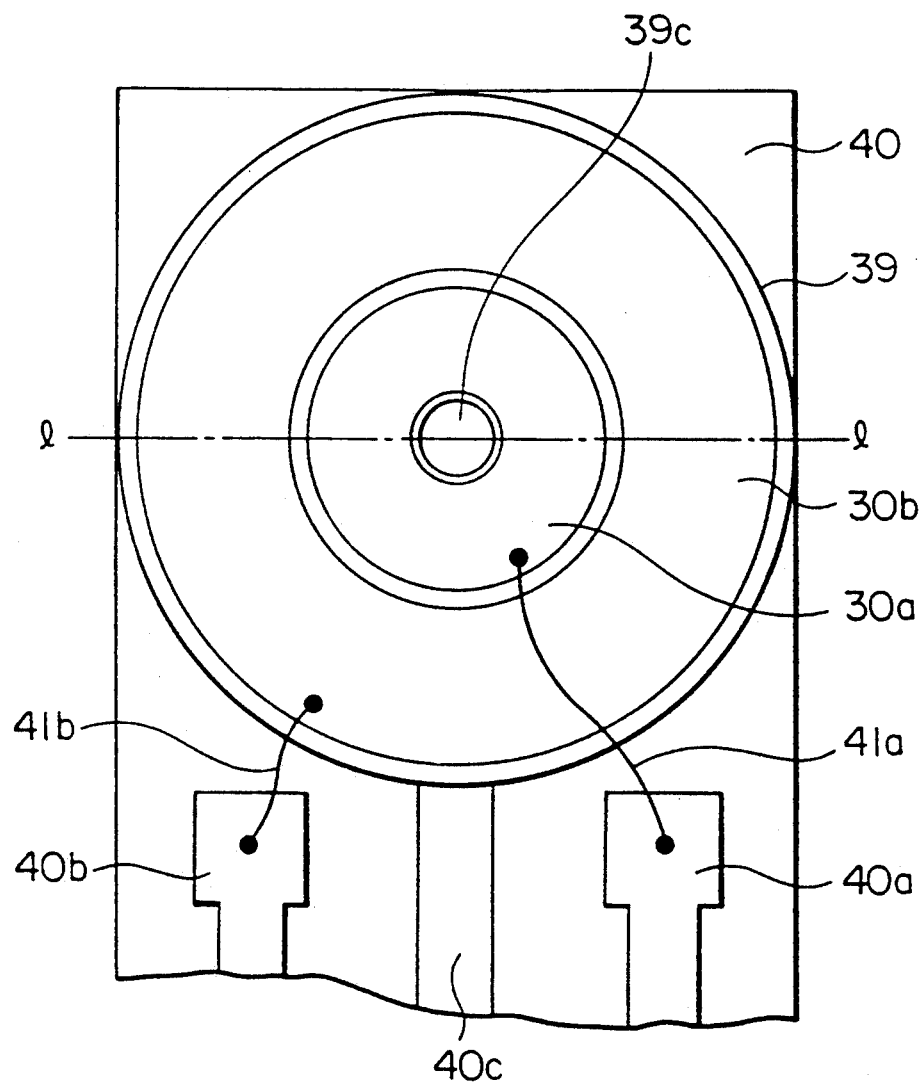
FIG. 29 shows a stepped concentric configuration of the photodetectors of an optical distance detector according to this invention, wherein FIG. 29 (a) is a plan view thereof while FIG. 29 (b) is a side elevational sectional view thereof.
Figure 29B:
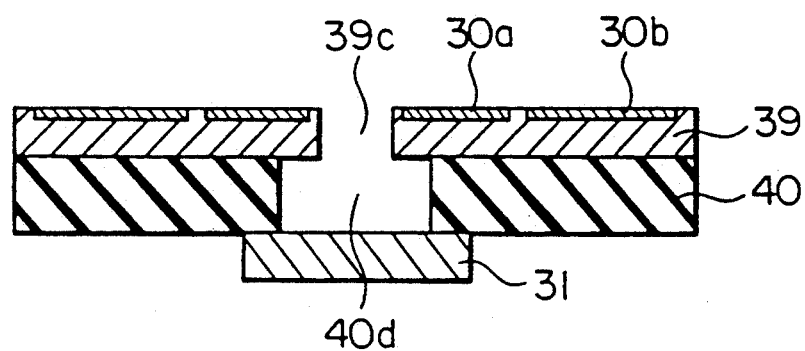

FIG. 29 shows a first embodiment of the stepped concentric configuration of the photodetectors, wherein FIG. 29 (a) shows a plan view of the configuration while FIG. 29 (b) shows a vertical section thereof along line 1—1 in FIG. 29 (a). Annular first and second photodetectors 30a and 30b are carried on a disk-shaped photodetector chip 39 having a central circular through hole 39c extending vertically therethrough. The disk-shaped photodetector chip 39 is mounted on the upper surface of an electrically insulating rectangular spacer member 40 having a circular through hole 40d extending vertically therethrough in registry with the through hole 39c of the photodetector chip 39c. The diameter of the through hole 40d of the spacer 40 is greater than that of the through hole 39c of the photodetector chip 39. A rectangular light-emitting diode 31 is mounted at the upper light-emitting surface thereof to the lower surface of the spacer 40, in registry with its through hole 40d; since the rectangular diode 31 has sides longer than the diameter of the through hole 40d of the spacer 40, the through hole 40d is closed from below by the upper surface of the light-emitting diode 31.

Figure 30A:
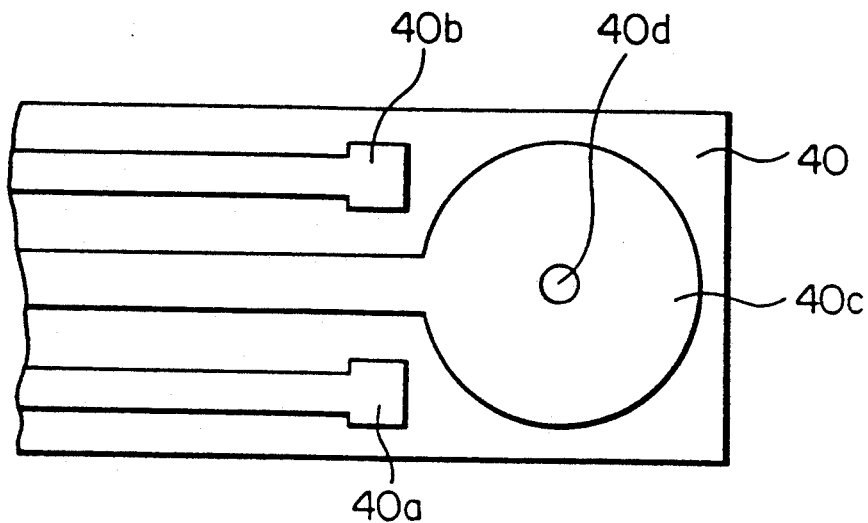
FIGS. 30 (a,b) show the top and bottom views of the spacer of the distance detector of FIG. 29.
Figure 30B:
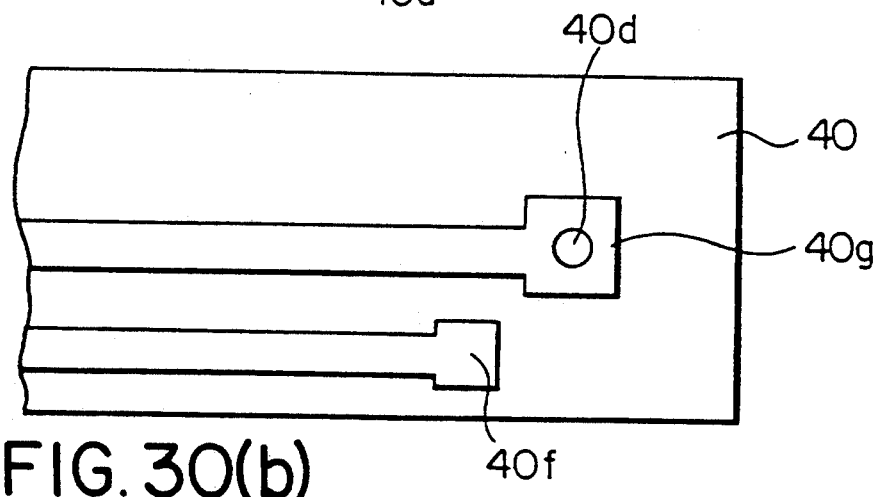
Figure 31:
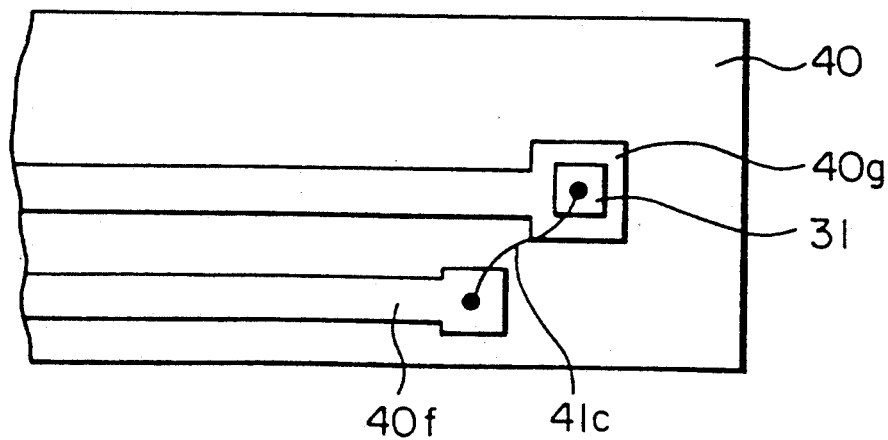
FIG. 31 shows the bottom view of the spacer of FIG. 30 on which the light-emitting diode is mounted.

Electrical connections to and from the diode 31 and the photodetectors 30a and 30b are effected as follows. The spacer 40 has a printed circuit on both the upper and lower surfaces for making electrical interconnections. Namely, as shown in FIG. 30 (a), on the upper surface of the spacer 40 is carried a printed circuit which includes the following electrical connections: an electrode or lead 40c having a disk-shaped end portion with a central hole in registry with the through hole 40d of the spacer, which electrode 40c is to be coupled electrically, via an electrically conductive adhesive agent, to the cathode of the photodetectors 30a and 30b formed on the lower surface of the disk-shaped photodetector chip 39, and a pair of leads 40a and 40b to be electrically coupled to the anodes on the upper surfaces of the first and second photodetectors 30a and 30b, respectively, via bonding wires 41a and 41b, respectively. Further, as shown in FIG. 30 (b), on the lower surface of the spacer 40 is carried a printed circuit which includes the following electrical connections: a lead 40g having a rectangular end portion with a central hole in registry with the through hole 40d of the spacer 40, which lead 40g is to be coupled electrically to the upper or light-emitting surface of the diode 31 via an electrically conductive adhesive, and a lead 40f which is to be electrically coupled to the lower surface of the light-emitting diode 31 via a bonding wire 41c, as shown in FIG. 31.

Figure 32A:
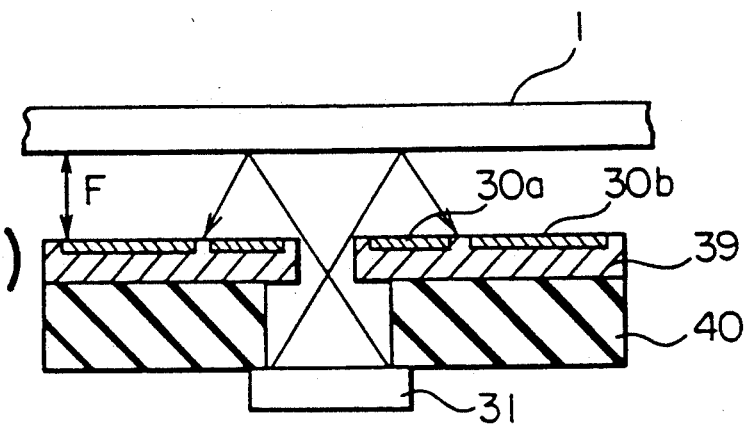
FIGS. 32 and 33 show the optical distance detector of FIG. 29 in operation, in the two cases of great and small measured distance, respectively (FIGS. 32 (a) and 33 (a)), together with the intensity of light incident thereon (FIGS. 32 (b) and 33 (b))
Figure 32B:
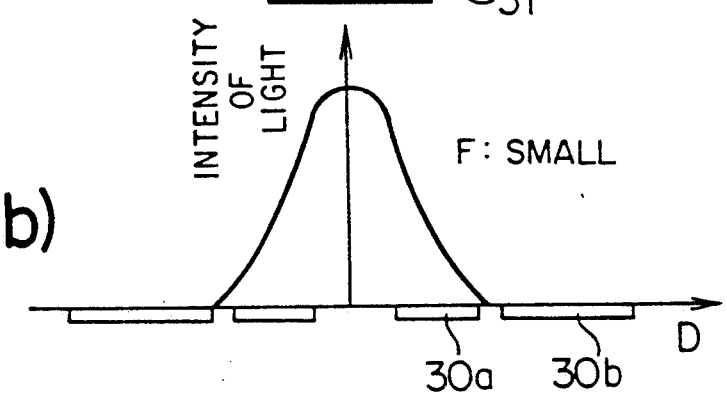
Figure 33A:
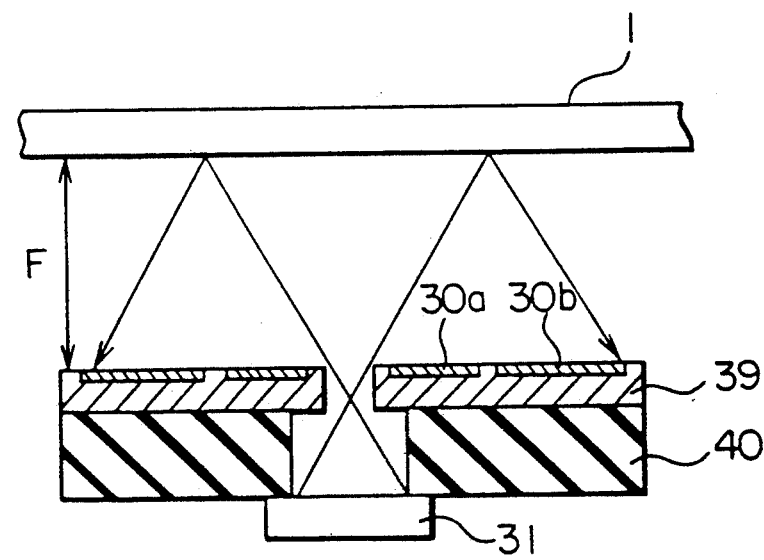
Figure 33B:
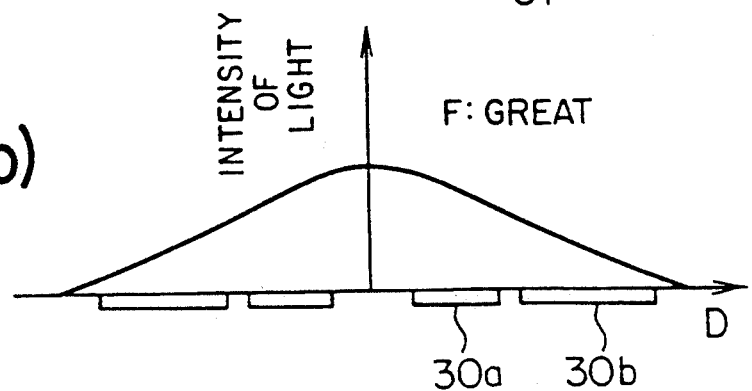

FIGS. 32 and 33 show the assembly of FIG. 29 in operation. The light emitted from the diode 31 radiates through the through holes 40d and 39c of the spacer 40 and the photodetector chip 39 to be reflected by the lower surface of the object, i.e., an optical disk 1. The light reflected by the disk 1 is received by the first and second photodetectors 30a and 30b, which are concentric with the light-emitting diode 31. FIG. 32 (a) shows a vertical section along a diameter of the disk-shaped photodetector chip 39. The view corresponds to the case where the distance between the disk 1 and the detector surface (i.e., the upper surface of the photodetector chip 39) is small. On the other hand, FIG. 33 (a) shows the same section in the case where the distance is great. FIGS. 32 (b) and 33 (b) show, in the cases of small and great measured distance F, respectively, the relation between the distance D (taken along the abscissa) from the center of the concentric photodetectors and the intensity of light (taken along the ordinate) incident on a point on the detector surface which is separated from its center by a distance D. Since the distribution of the intensity of light incident on the detector surface is rotationally symmetric with respect to the center of the photodetector chip 39, the intensities of light incident on the concentric annular light-receiving surfaces of the photodetectors 30a and 30b are substantially uniform over the whole area thereof. Thus, the configuration of the photodetectors according to this embodiment enables accurate and efficient measurement of the distance F between the surface of the chip 39 and the disk 1. Further, the light-emitting surface of the diode 31 and the light-receiving surface of the first photodetector 30a can be made horizontally (i.e., radially) so close to each other that the projections of these light-emitting and light receiving surfaces to a horizontal plane along the direction of the optical axis are overlapped upon each other. Thus, the measurement of extremely small distances is made possible.

Figure 34A:
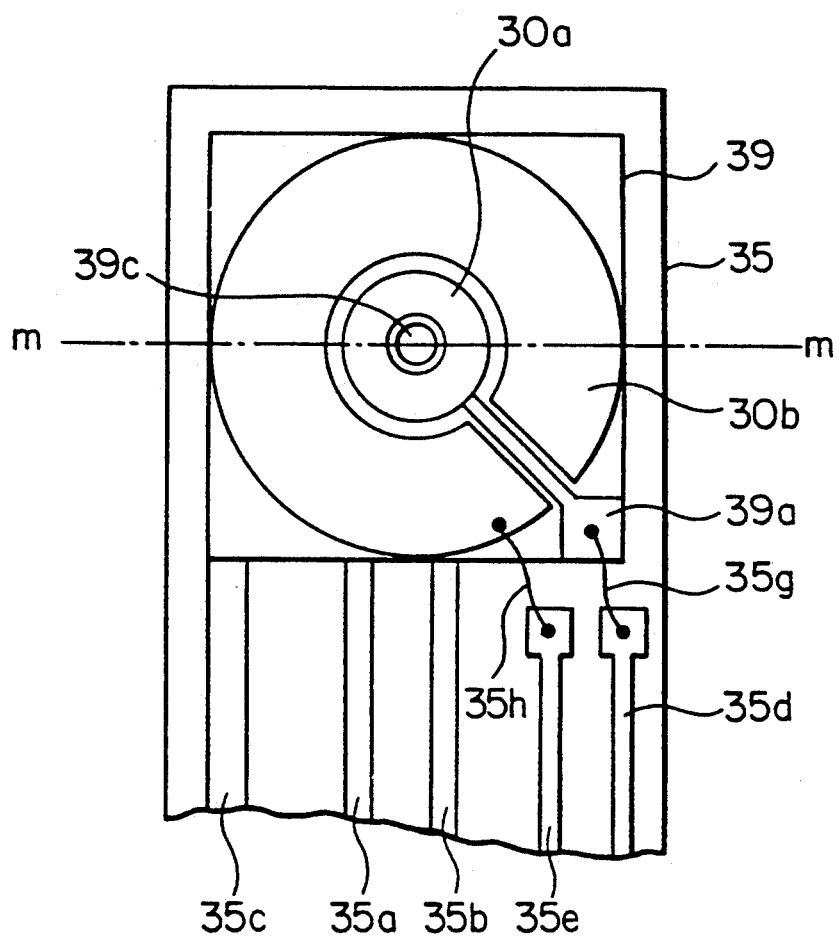
FIG. 34 shows a stepped configuration of the photodetectors of an optical distance detector according to this invention similar to that shown in FIG. 30, wherein FIG. 34 (a) is a plan view thereof while FIG. 34 (b) is a side elevational sectional view thereof.
Figure 34B:
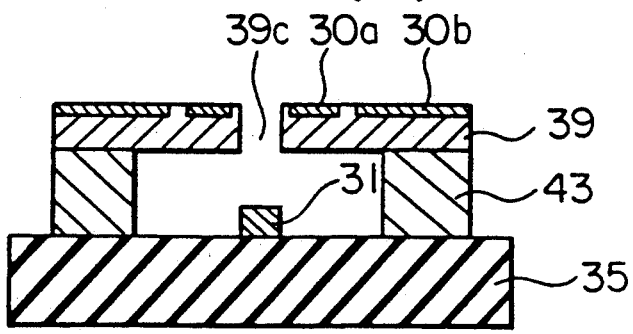

FIG. 34 shows let us describe a second embodiment having a stepped concentric configuration of photodetectors in which the efficiency is forming the electrical connections is improved. FIG. 34 (a) and (b) are a plan view and a vertical sectional view thereof, respectively, FIG. 34 (b) showing a section along the line m—m in FIG. 34 (a).

Figure 35A:
FIG. 35 (a) and (b) show an end view and a plan view of a spacer member of the optical distance detector of FIG. 34, respectively.
Figure 35B:
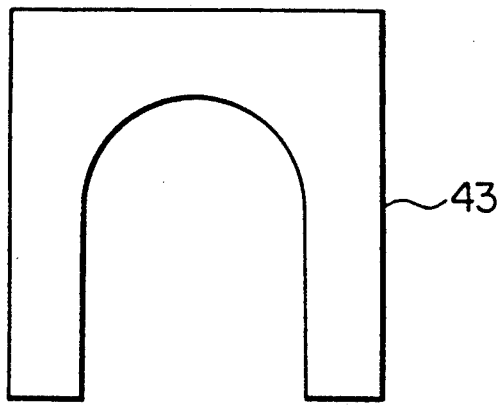
Figure 36:
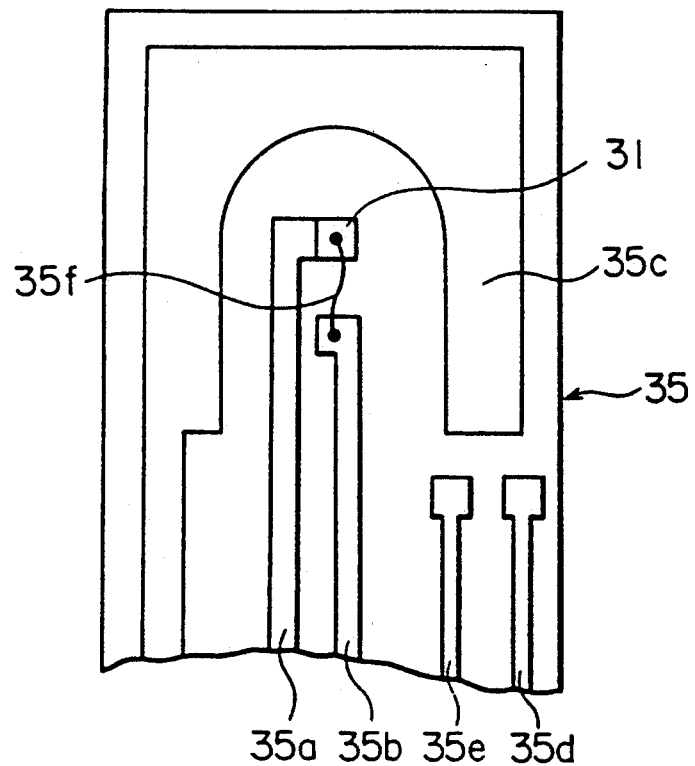
FIG. 36 is a plan view of the substrate of the optical distance detector of FIG. 34.

A rectangular photodetector chip 39 having a central through hole 39c carries on its upper surface annular first and second photodetectors 30a and 30b which are concentric with the central hole 39c. The second photodetector 30b has a radially extending cut-out portion through which the lead 39a coupled to the anode of the first photodetector 30a extends. The lower surface of the rectangular photodetector chip 39 which constitutes the cathode of the photodetectors 30a and 30b is mounted on a printed circuit board or substrate 35 via an electrically conductive spacer member 43. As shown in FIG. 35, the spacer 43 has horizontally the form of U, the open end of which is directed downward in the figure. On the other hand, as shown in FIG. 36, the substrate 35 carries on its upper surface the following pattern of a printed circuit: a connection or lead 35c having a U-shaped end portion on which the spacer 43 is mounted via an electrically conductive adhesive, leads 35a and 35b coupled to the lower and the upper surface of the light-emitting diode 31, respectively, via an electrically conductive adhesive and a bonding wire 35f, respectively, and leads 35d and 35e to be coupled to the anode of the first and second photodetectors 30a and 30b, respectively, via bonding wires 35g and 35h, respectively. The light-emitting diode 31 is mounted on the end portion of the lead 35a on the substrate 35, to be horizontally in registry with the central hole 39c of the photodetector chip 39. The connection between the cathode (lower surface) of the chip 39 and the spacer 43 is effected by an electrically conductive adhesive. The spacer 43 is thick enough to allow the bonding wire 35f to be coupled to the upper surface of the diode 31 without making contact with the lower surface of the photodetector chip 39.

The operation of the assembly of FIG. 34 is as follows. The light emitted from the diode 31 is radiated upward through the through hole 39c to be reflected by a specular surface of an object. Thus, its operation is substantially identical to that of the first embodiment (shown in FIG. 29) having the stepped concentric photodetector configuration. However, in the case of this second embodiment, the electrical connections are made by means of a printed circuit formed on a single surface of the substrate 35. Thus, the time and labor required in forming the pattern of printed circuit on the substrate 35 and in mounting the electrical components thereon are reduced.

Figure 37:
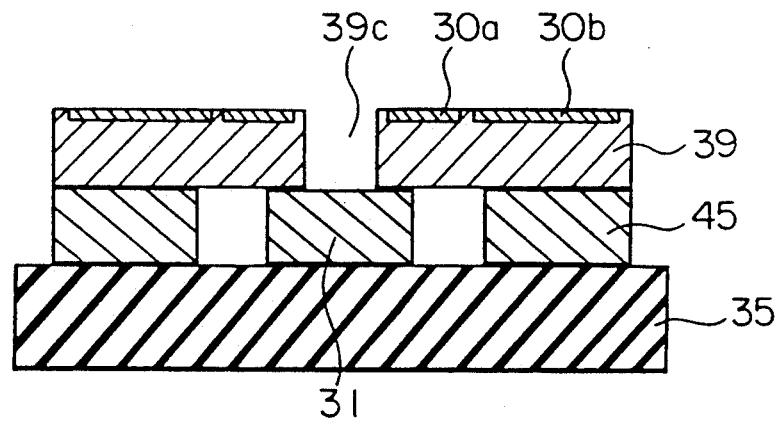
FIG. 37 is a side elevational sectional view of another stepped concentric configuration of the photodetectors of an optical distance detector according to this invention.
Figure 38:
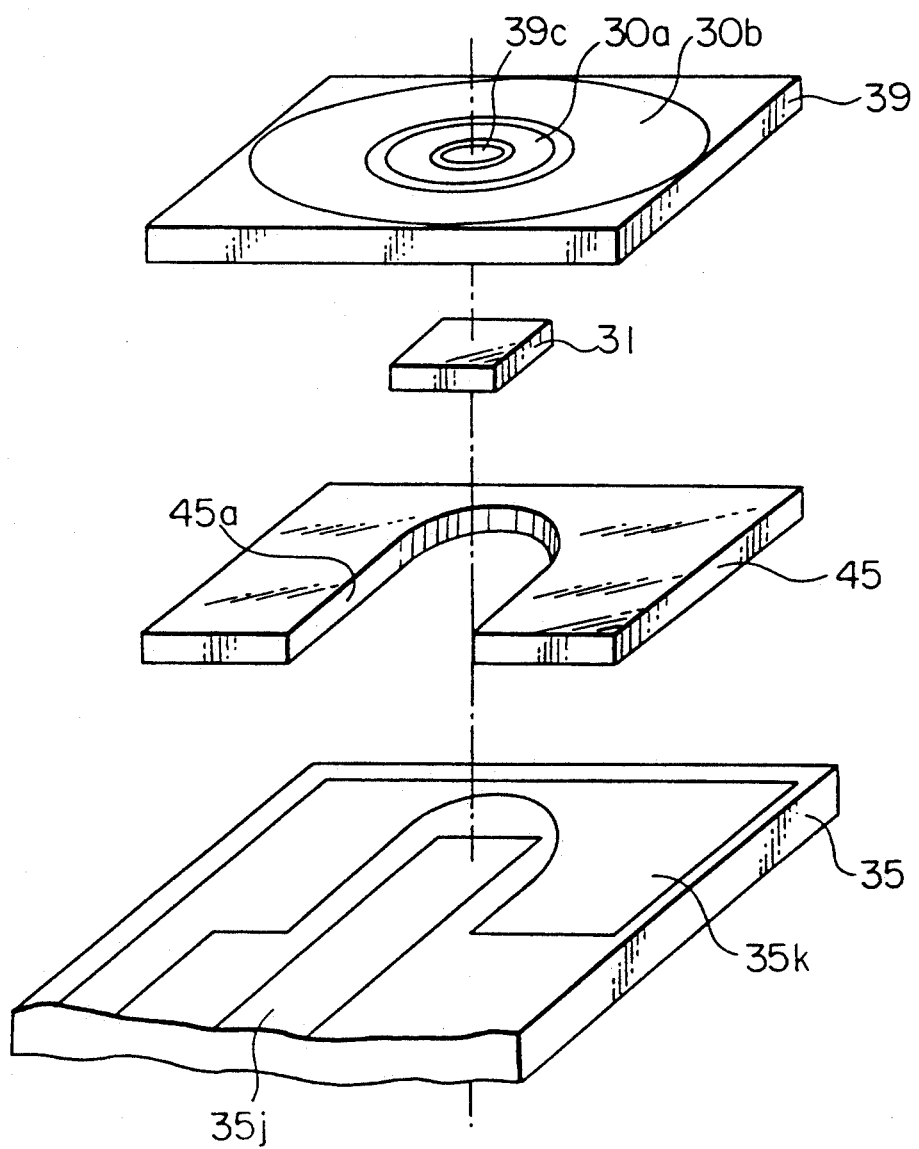
FIG. 38 is an exploded perspective view of the configuration of the photodetectors of FIG. 37.

Referring now to FIGS. 37 and 38 of the drawings, a third embodiment having a stepped concentric configuration of photodetectors will be described. FIG. 37 shows a vertical section thereof, while FIG. 38 is an exploded perspective view thereof.

A rectangular plate-shaped photodetector chip 39 carries on its upper surface annular first and second photodetectors 30a and 30b which are concentric with the central through hole 39c of the chip 39. The photodetector chip 39 is mounted on a substrate 35 via an electrically conductive spacer 45. The rectangular plate-shaped spacer 45 has a U-shaped notch 45a having a large enough dimension to receive a rectangular plate-shaped light-emitting diode 31 horizontally therein without contact. On the upper surface of the substrate 35 is formed a pattern of printed circuit comprising leads 35j and 35k. The light-emitting diode 31 is mounted on the end portion of the lead 35j via an electrically conductive adhesive material. The spacer 45 is mounted, via an electrically conductive adhesive material, on the end portion of the lead 35k having a form corresponding thereto. The lower surface of the photodetector chip 39 constituting its cathode is connected via an electrically conductive adhesive material to the upper surface of the spacer 45 and the upper surface of the light-emitting diode 31.

Figure 39:
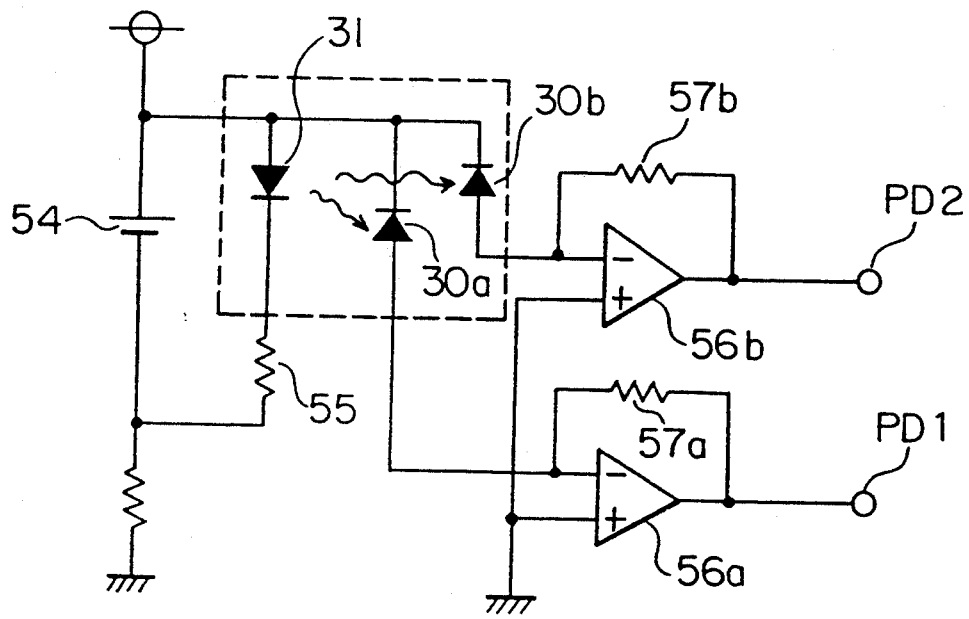
FIG. 39 is a circuit diagram showing the circuit for driving the light-emitting diode and the photodetectors of the optical distance detector of FIG. 37.

In the case of this embodiment, the cathode of the photodetector chip 39 and the light-emitting surface of the diode 31 are electrically coupled to each other. Thus, the circuit for driving them must be organized with special care. FIG. 39 shows an example of the drive circuit for the light-emitting diode 31 and the photodetector (photodiodes) 30a and 30b. The diode 31 is coupled across a battery 54 via a resistor 55. On the other hand, the photodetectors 30a and 30b, whose cathodes are coupled to the positive terminal of the battery 54, are coupled at their anodes to the inverting input of the amplifiers 56a and 56b, respectively. The output PD1 and PD2 of the amplifiers 56a and 56b, which constitute the output of the photodetectors 30a and 30b, respectively, are fed back to the inverting input of the amplifiers 56a and 56b, respectively, by negative feedback resistors 57a and 57b, respectively. The non-inverting inputs of the amplifiers 56a and 56b are grounded.

When the light emitted from the diode 31 radiates on the reverse-biased photodiodes 30a and 30b, a reverse current proportional to the amount of incident light flows through each one of the photodiodes 30a and 30b. Thus, the outputs PD1 and PD2 correspond to the amount of light incident on the photodiodes 30a and 30b, respectively.

Bimorph Type Actuators (a) Typical Structures and their Disadvantages

Figure 40:
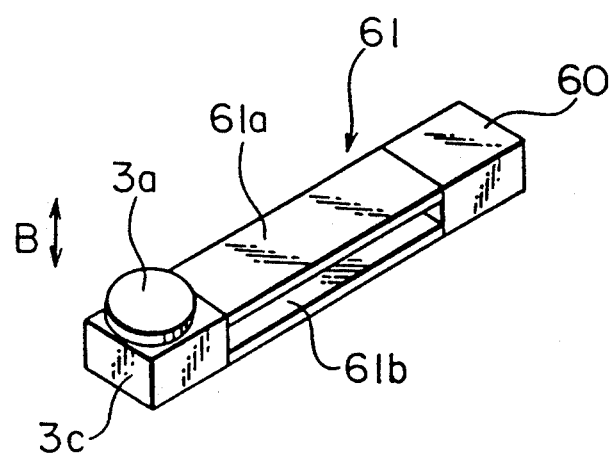
FIG. 40 is a perspective view of a typical bimorph type actuator for driving the optical head of an optical disk recording and reproducing device.
Figure 41:
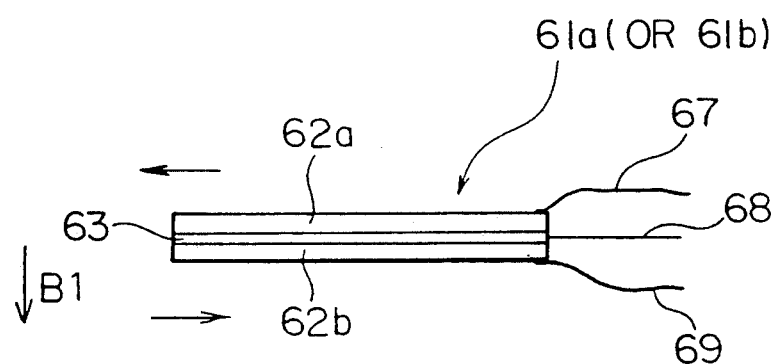
FIG. 41 is a side view of a piezoelectric bimorph element of the actuator of FIG. 40 in operation.

In the optical disk recording and reproducing device described above, a bimorph type actuator is used to control the distance between the magnetic head and the recording surface of the magnetic disk. FIG. 40 shows a typical structure of the bimorph type actuator which is used for driving the object lens of the optical head. Thus, a bimorph type actuator 61, which consists of a pair of parallel plate-shaped bimorph elements 61a and 61b, is fixed at one end thereof to a support member 60, and, at another end thereof, coupled to an object lens holder 3c on which the objective lens 3a of the optical head is mounted. As shown in FIG. 41, each bimorph plate 61a or 61b consists of a pair of piezoelectric plate-shaped elements 62a and 62b and an elastic shim 63 held therebetween. The shim 63 is made of a metal such as copper and also functions as an electrode for the piezoelectric plates 62a and 62b. Leads 67 and 69 are coupled to the upper surface of the piezoelectric plates 62a and 62b, respectively: Lead 68 is coupled to the electrically conductive shim 63. Thus, the piezoelectric plates 62a and 62b are polarized in the direction of their thickness when a driving voltage is applied thereacross via the electrodes 67 through 69. The parallel structure of the two bimorph plates 61a and 61b of the actuator 61 is aimed at minimizing the slanting of the lens 3a from the horizontal direction.

Figure 42:
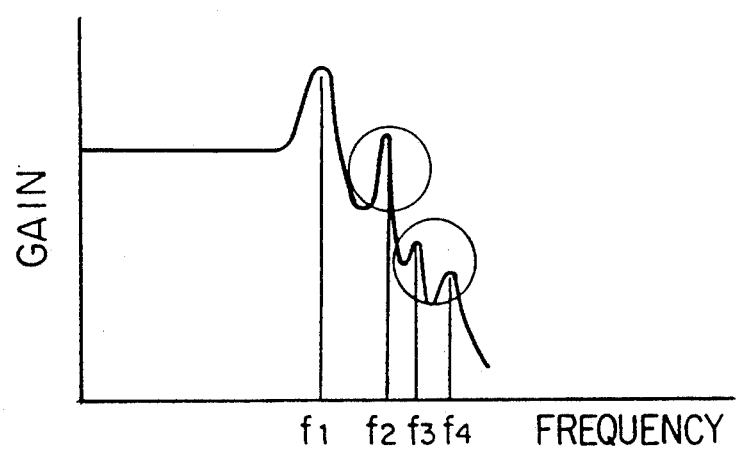
FIG. 42 is a graph showing the frequency characteristics of the gain of the actuator of FIG. 40.

The operation of the bimorph type actuator 61 of FIG. 40 is as follows. When a voltage is applied across the piezoelectric plates 62a and 62b of each one of the bimorph plates 61a and 61b of the bimorph type actuator 61 via the leads 67 through 69 in such a way that the electrodes 67 and 69 have the same polarity while the electrode 68 has the opposite polarity, one of the piezoelectric plates 62a and 62b expands and the other contracts. For example, the upper plate 62a expands and the lower plate 62b contracts, as shown by horizontal arrows in FIG. 41. However, the elastic shim 63, to which the opposing surfaces of the piezoelectric plates 62a and 62b are fixedly secured, does not change its length. Thus, the bimorph plates 61a and 61b are bent downward in the direction B1 as shown in FIG. 42. Conversely, when the polarity of the applied voltage is reversed, the upper piezoelectric plate 62a contracts and the lower plate 62b expands. As a result, the bimorph plates 61a and 61b, and hence the whole actuator 61, are deflected in the upward direction. The focusing error of the objective lens 3a is detected by an optical distance detector, for example, and the voltage applied to the bimorph plates 61a and 61b are controlled in accordance with the detected focusing error. Thus, the holder 3c and the object lens 3a mounted thereon are driven in the vertical direction B perpendicular to the recording surface of the optical disk in response to the detected focusing error, and the distance between the lens 3a and the recording surface of the optical disk is adjusted in such a manner that the focusing error is reduced to zero.

The bimorph type actuator of FIG. 10 as described above, however, has the following disadvantages. As shown in FIG. 42, the gain (taken along the ordinate) of the actuator, i.e., the amount of vertical deflection or displacement thereof in relation to the voltage applied thereacross, has high peaks, with regard to the frequency f (taken along the abscissa) of the voltage applied to the actuator, at relatively low second, third, and fourth resonance frequencies $f_2$, $f_3$, and $f_4$, in addition to the first or lowest resonance frequency $f_1$. Thus, if the frequency of the voltage applied across the bimorph plates 61a and 61b of the actuator 61 comes into the range where the higher resonance frequencies $f_2$, $f_3$, etc. lie, the amount of deflection of the actuator, or the amplitude of oscillation thereof becomes abruptly great at these higher resonance frequencies. As a result, the frequency range of the actuator 61 must be limited within a region which lies below and outside of the higher resonance frequencies. Further, the structure in which the bimorph plates 61a and 61b run parallel to each other makes the assembling process a time and labor consuming process. Further, the same structure limits the amount of vertical displacement of the lens 3a which can be achieved by the deflection of the actuator 61.

Figure 43:
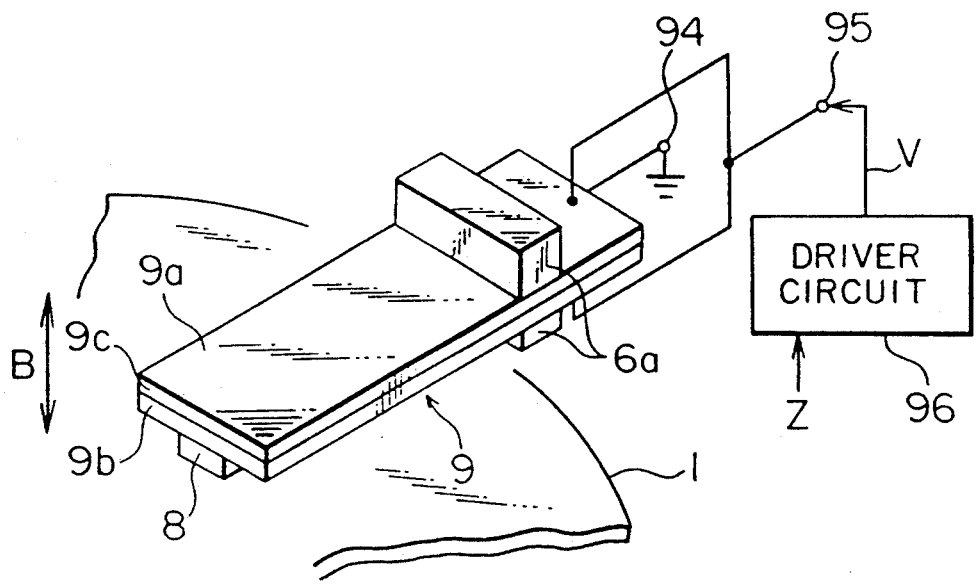
FIG. 43 is a perspective view of a typical bimorph type actuator for driving the magnetic head of an optical disk recording and reproducing device, showing together therewith a driver circuit thereof.

On the other hand, FIG. 43 shows a typical structure of a bimorph type actuator for driving the magnetic head 8 of an optical disk recording and reproducing device. The actuator of FIG. 43 is similar to that described above in connection with an embodiment of an optical disk recording and reproducing device having a bimorph type actuator for driving its magnetic head. Namely, the actuator 9 of FIG. 43 comprises a pair of piezoelectric plate-shaped elements 9a and 9b provided with electrodes on their surfaces, and an electrically conductive plate 9c fixedly held therebetween. A pair of supporting plates 6a fixedly supports therebetween the oscillation center of the bimorph type actuator 9 from the upper and lower sides thereof. The magnetic head 8 is mounted to the free end of the actuator 9 to oppose the recording surface of the optical disk 1.

As described above in reference to FIGS. 7 through 9, etc., the distance between the magnetic head 8 and the surface of the disk 1 is detected by a distance detector (not shown) from which a distance signal Z is supplied to the driver circuit 96 which drives the actuator 9. The driver circuit 96 outputs a voltage V in response to the distance signal Z to a terminal 95 coupled to the electrode at the upper surface of the upper piezoelectric plate 9a and to the electrode at the lower surface of the lower piezoelectric plate 9b. The terminal 94 coupled to the electrically conductive plate 9c is grounded. Thus, a voltage V output from the driver circuit 96 which corresponds to the distance error between the magnetic head 8 and the recording surface of the disk 1 is applied across the piezoelectric plates 9a and 9b of the actuator 9. In response thereto, the actuator 9 is deflected in the direction B perpendicular to the recording surface of the disk 1 to maintain the distance between the head 8 and the disk 1 at a predetermined constant magnitude. Since the structure and operation of optical disk recording and reproducing device have already been described, further description of the device is deemed unnecessary.

Figure 44:
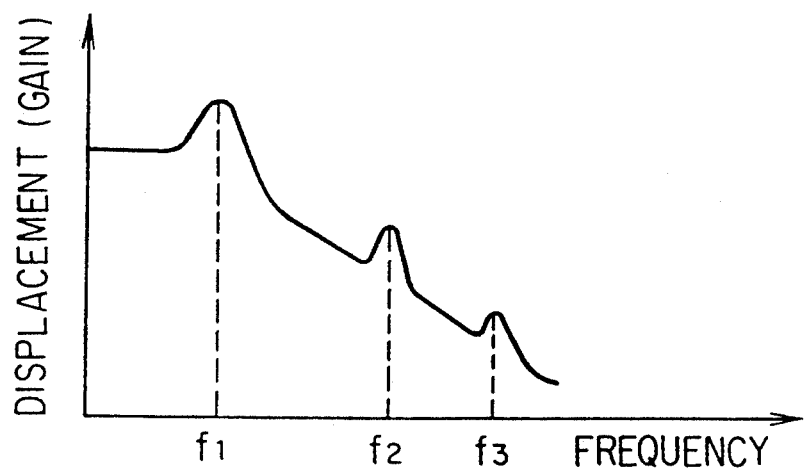
FIG. 44 is a graph showing the frequency characteristics of the gain of the actuator of FIG. 43.

The distance signal Z varies at various frequencies. Thus, the voltage V corresponding thereto comes to be an A.C. voltage having the same frequency as the distance signal Z. This voltage V output from the driver circuit 96 is applied to the actuator 9. Thus, the actuator of FIG. 43 has the same kind of disadvantage as the actuator of FIG. 40 with respect to the frequency characteristics of its gain (i.e. the amount of displacement or deflection of the actuator in relation to the voltage applied thereacross). FIG. 44 shows an example of the relation between the frequency f (taken along the abscissa) and the gain or amount of displacement of the actuator (taken along the ordinate), which relation is determined primarily by the dimension and mechanical properties of the actuator. As shown in the figure, the amount of displacement has high peaks at relatively low second and third resonance frequencies $f_2$ and $f_3$, besides the first or lowest resonance frequency $f_1$. Thus, if the frequency of the voltage applied across the actuator 9 comes into the range where the higher resonance frequencies $f_2$, $f_3$ lie, the amount of deflection of the actuator, or the amplitude of oscillation thereof, becomes undesirably great at these higher resonance frequencies. As a result, the frequency range of the actuator 9 must be limited within a region which lies below and outside of the higher resonance frequencies $f_2$ and $f_3$ which are relatively low.

The above problems of the actuators of FIGS. 40 and 43 are solved according to the principle of this invention in two ways: first, by a special geometry of the bimorph type actuator itself, and second, by providing a circuit for suppressing the higher order resonance frequency components. In the following, embodiments of the bimorph type actuator which solve the above problens according to these two methods are described under each sub-headings.

(b) Actuators having a Shim of Special Geometry

Under this sub-heading, embodiments of bimorph type actuators having an elastic shim member with a special geometry that is effective for suppressing vibrations of undesirable modes are described. In these embodiments, the width of the shim is varied in the longitudinal direction of the plate-shaped actuators according to the function which represents the form of a beam vibrating in a normal free lateral vibration mode, as explained in detail below.

Figure 45:
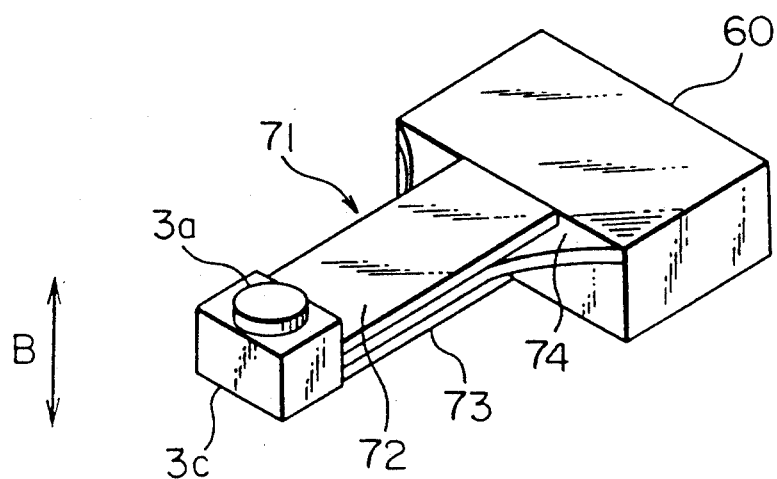
FIG. 45 is a perspective view of a bimorph type actuator according to this invention for driving the optical head of an optical disk recording and reproducing device, which actuator having a shim of special geometry effective for suppressing vibrations modes at higher resonance frequencies.
Figure 46:
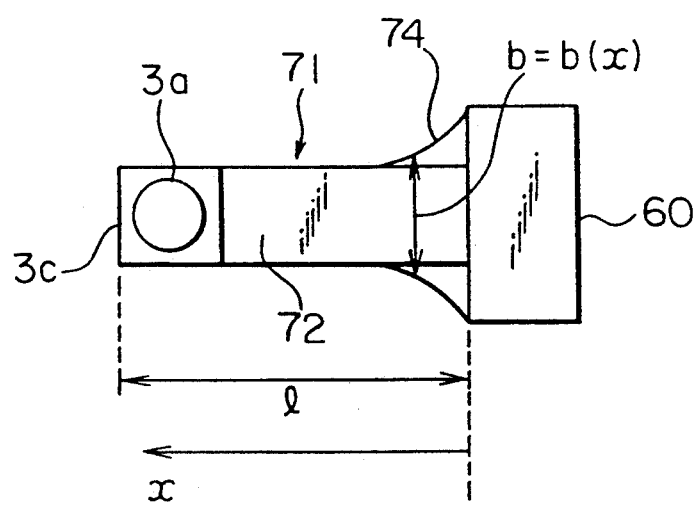
FIG. 46 is a plan view of the actuator of FIG. 45.

First, referring to FIGS. 45 and 46, let us describe a first embodiment of the bimorph type actuator in which the shim held between the piezoelectric plate-shaped elements have a special geometry for suppressing vibrations of higher modes other than the first or lowest mode. The actuator 71 comprises a pair of rectangular plate-shaped piezoelectric element 71 and 73, and a plate-shaped elastic shim 74 held fixedly therebetween. The width of the shim 74 varies with respect to the longitudinal distance x according to a special function as described in detail below. The piezoelectric plates 71 and 72 are provided at upper and lower surfaces thereof with electrodes and are thereby polarized in the direction of their thickness. The actuator 71 is fixedly supported at one end thereof by a support member 60 and is coupled at the free end thereof to the holder 3c carrying the objective lens 3a.

The width b=b(x) of the shim 74 is related to the longitudinal distance x measured from the side the support member 60 in the following manner. Let Y(x) be the normal function of the first or lowest mode of free natural lateral vibration of a beam which is supported at its two ends by a fixed and roller support, respectively. Then, the form of the sides of the shim 74 is defined in such manner that the width b=b(x) is inversely proportional to this normal function Y(x), i.e., $$b(x) \propto 1/Y(x).$$

The normal function Y(x) of the first or lowest mode of vibration may be defined as follows. The free natural vibration of the beam in the lateral direction (i.e. in a direction perpendicular to the longitudinal axis of the beam) may be expressed in the form $$y(x,t) = Y(x) \cdot \sin(\omega t),$$

wherein y(x,t) represents the amount of deflection (i.e. lateral displacement) as a function of the longitudinal distance x and the time t, and $\sin(\omega t)$ is a function of time t alone ($\omega$ is the angular frequency of the vibration). The function Y(x) represents the form of the vibrating beam as a function of the distance x. When the beam is vibrating in its lowest or first natural free vibration mode, the function Y(x) representing the form of the beam in such vibration mode is referred to as the normal function of the first or lowest mode of vibration. As well known in the mechanics of vibrations of beams, the normal function Y(x) of the first or lowest mode of vibration of a beam which is supported at its two ends by a fixed and a roller support, respectively, is given by the following equation:

$$Y(x) = (\cos\beta 1 - \cosh\beta 1)(\cosh\beta x - \cos\beta x) + (\sin\beta 1 + \sinh\beta 1)(\sinh\beta x - \sin\beta x),$$

wherein 1 is the longitudinal length of the beam and the value of $\beta 1$ is given by $\beta 1 = 2.365$.

Figure 47:
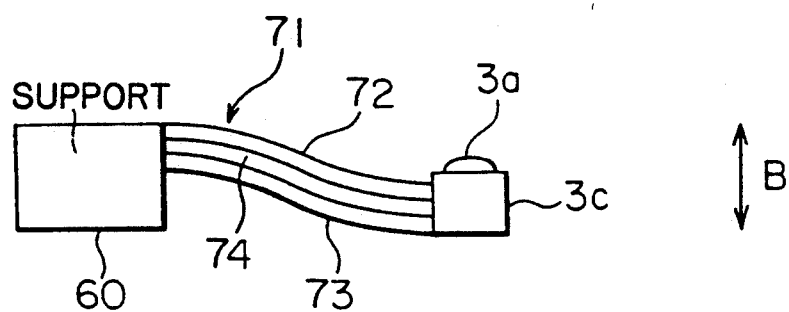
FIG. 47 is a side view of the actuator of FIG. 45 in operation.
Figure 48:
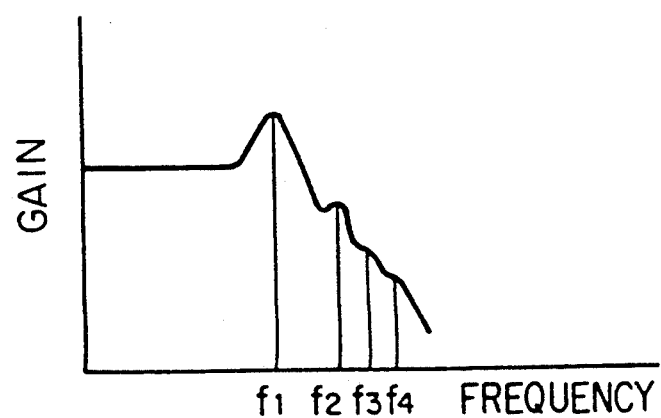
FIG. 48 is a graph showing the frequency characteristics of the gain of the actuator of FIG. 46.

In operation, a voltage corresponding to the focusing error is applied across the piezoelectric plates 71 and 73 of the actuator 71. Thus, the actuator 71 is deflected in the direction B to reduce the focusing error of the lens 3a. Since the shim 74 has the horizontal form as described above (i.e. its width b is related to the longitudinal distance x as defined above), and further, the amount of bending of a beam at a lateral cross section thereof is proportional to the moment of inertia of the cross sectional area and hence is inversely proportional to its width provided that its thickness is constant, the actuator 71 is deflected in the vibration mode of a beam supported at its two ends by a fixed (i.e. built-in) and a roller support. As a result, as shown in FIG. 47, the objective lens holder 3c is translated in the direction B without being slanted from the horizontal direction. Further, as shown in FIG. 48, thanks to the special geometry of the shim 71, higher resonance peaks $f_2$, $f_3$, $f_4$ of the gain (the amplitude of deflection with respect to the driving voltage), which peaks correspond to natural free vibrations of higher modes, are suppressed. Hence, the actuator 71 can be used in a wide frequency range spreading over the higher resonance frequencies.

Figure 49:
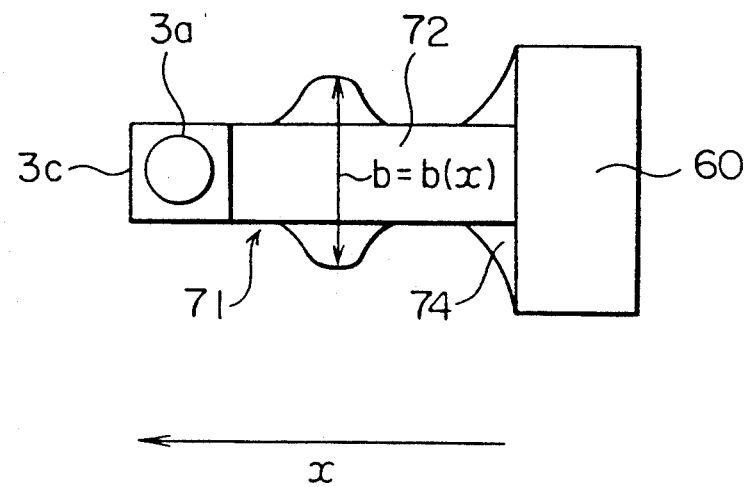
FIG. 49 is a plan view of another bimorph type actuator according to this invention for driving the optical head of an optical disk device, which actuator having a shim of special geometry effective for suppressing vibrations modes at resonance frequencies other than the second resonance frequency.
Figure 50:
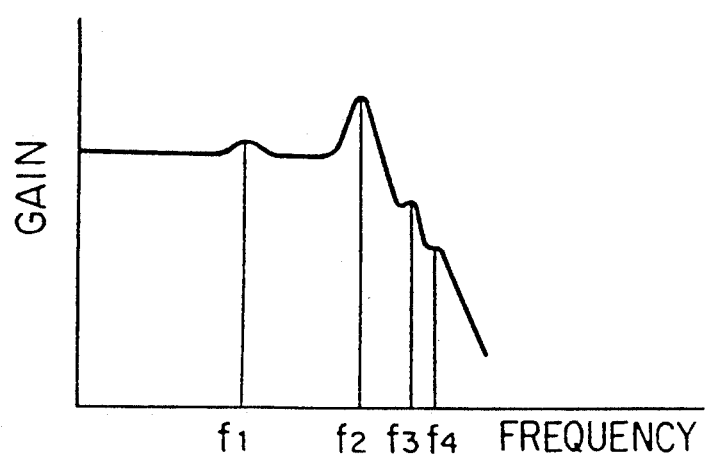
FIG. 50 is a graph showing the frequency characteristics of the gain of the actuator of FIG. 49.

According to the first embodiment, the width b=b(x) of the shim 74 is related to the longitudinal distance x in such a manner that it is inversely proportional to the normal function of the first vibration mode. FIG. 49 shows a second embodiment in which the the width b=b(x) of the shim 74 is related to the longitudinal distance x in such a manner that it is inversely proportional to the normal function of the second vibration mode. Namely, the width b=b(x) of the shim 74 of the actuator of FIG. 49 is given by the following equation:

$$b(x) \propto 1/Y(x),$$

wherein Y(x) is the normal function of the second mode of free natural lateral vibration of a beam which is supported at its two ends by a fixed and a roller support, respectively. Thus, as shown in FIG. 50, the peaks $f_1$, $f_3$, and $f_4$, etc. of the gain of the actuator 71 other than the second resonance peak $f_2$ are suppressed. As a result, the so-called resonance frequency of the system $f_0$ can be set at a higher frequency.

According to the above-described first and second embodiments, the width b=b(x) of the shim has been set by the equation:

$$b(x) \propto 1/Y(x),$$

wherein Y(x) is the normal function of the first or the second mode, respectively, of free natural lateral vibration of a beam which is supported at its two ends by a fixed and a roller support, respectively. However, Y(x) in the above equation may be the normal function of the third or the fourth mode, or a combination of normal functions of two (or more) vibration modes. Further, the function Y(x) used in the above equation in defining the width b of the shim as a function of the longitudinal distance x may be the normal function of a beam which is fixedly supported at one of its ends but free at the other, or which is free both at its two ends.

Figure 51:
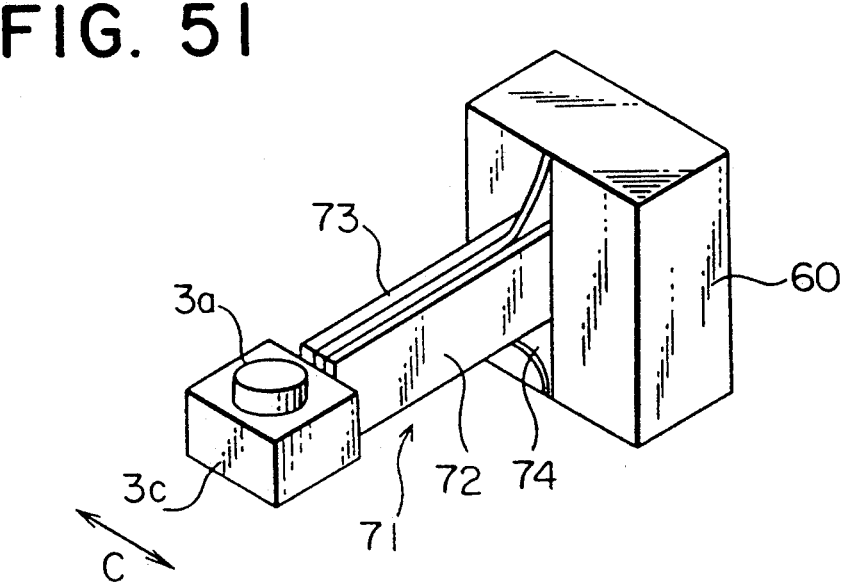
FIG. 51 is a perspective view of another bimorph type actuator according to this invention, having a shim of special geometry similar to that of the shim of the actuator of FIG. 45.

FIG. 51 shows an embodiment of an actuator 71 whose shim 74 has the same geometry as that of the first embodiment but which is used to drive the holder 3c carrying the objective lens 3a in the direction C perpendicular to the optical axis of the lens 3a. Thus, the actuator 71 controls the tracking error of the lens 3a. It will be easy for those skilled in the art to combine a pair of actuators, one for the focusing and the other for the tracking control, to obtain an actuator assembly for controlling the position of the lens 3a in the two directions.

Figure 52:
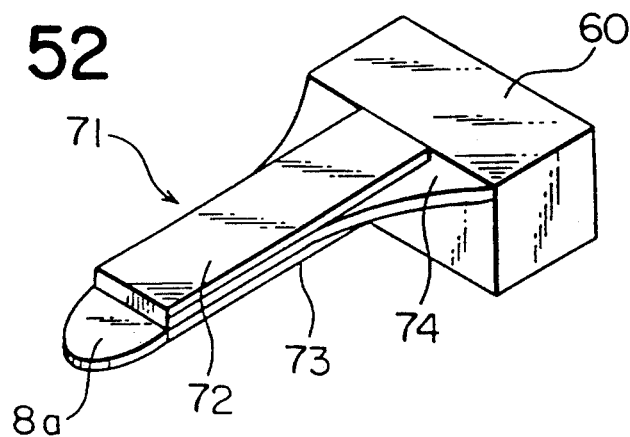
FIG. 52 is a perspective view of still another bimorph type actuator according to this invention for driving a magnetic head chip of a magnetic tape recording and reproducing device, which actuator having a shim of special geometry similar to that of the shim of the actuator of FIG. 45.

FIG. 52 shows another embodiment of an actuator 71 whose shim 74 has the same geometry as that of the first embodiment but which is used to drive a magnetic head chip 8a of a magnetic tape recording and reproducing device. Namely, a magnetic head chip 8a is mounted to the lower surface of the actuator 71. The actuator 71 drives the magnetic head chip 8a according to a principle similar to the one described above. Thus, the dislocation of the magnetic head chip 8a from the track on the magnetic tape is adjusted by the actuator 71, wherein the gain of the actuator is substantially leveled at the higher resonance frequencies.

Figure 53:
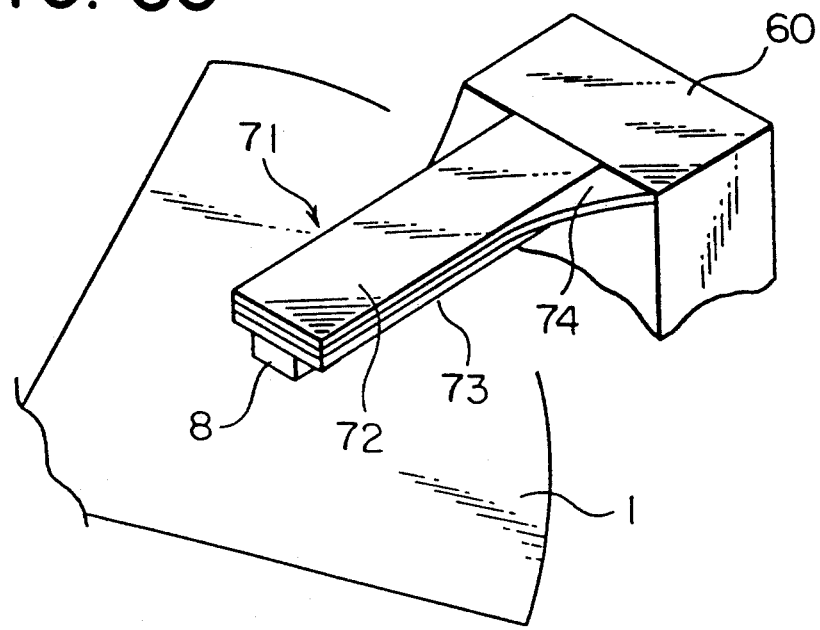
FIG. 53 is a perspective view of a further bimorph type actuator, according to this invention for driving the magnetic head of an optical disk recording and reproducing device, which actuator having a shim of special geometry similar to that of the shim of the actuator of FIG. 45.

FIG. 53 shows another embodiment of an actuator 71 having a shim 74 which has the same geometry as that of the first embodiment but which is used to drive a magnetic head of a magneto-optical recording and reproducing device. Namely, a magnetic head 8 is mounted to the lower surface of the actuator 71 to oppose the magneto-optical disk 1. A distance detector (not shown) detects the distance between the magnetic head 8 and the disk 1. In response to the detected distance, the actuator 71 drives the magnetic head 8 according to a principle similar to the one described above, so that the error of the distance may be reduced to zero.

A pair of piezoelectric elements 72 and 73 are attached to both the upper and lower surfaces of the shim 74 to obtain the bimorph type actuator 71 in the case of the above embodiments. However, a bimorph type actuator according to this invention may also be obtained by attaching a single piezoelectric element to one of the surface of the shim having a geometry that is effective in suppressing the vibration at undesirable resonance frequencies according to this invention.

The bimorph type actuators described under this sub-heading having a shim of special geometry effective for suppressing the vibration of undesirable modes have the following advantages. First, they can be used in a wide frequency range extending over the higher resonance frequencies. Second, they are capable of being deflected without being slanted at their free end, which makes them especially suited to be used as an actuator for driving the objective lens of an optical head, etc. Further, compared with the parallel paired structure of FIG. 40, they are simple in structure and can be assembled more easily. In addition, they allow a greater amount of deflection or displacement at their free end.

(c) Actuators with Drive Voltage Modification Circuitry

Under this sub-heading, actuators are provided with a simple circuit which suppresses the driving voltage of the actuator when the vibration frequency of the actuator approaches undesirable resonance frequencies.

Figure 54:
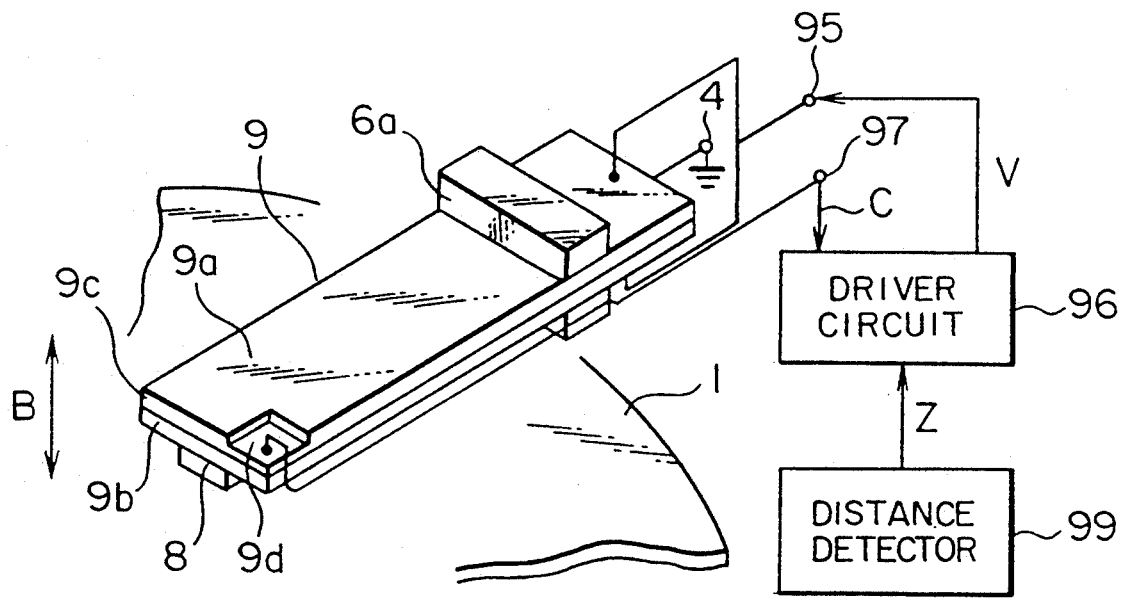
FIG. 54 is a perspective view similar to that of FIG. 43, but showing an actuator according to this invention wherein the bimorph element has a recess for outputting an acceleration signal of the vibration of the actuator.

FIG. 54 shows a first embodiment of such an actuator provided with drive voltage modification circuitry. This embodiment is similar to the actuator described under the sub-heading (a) in reference to FIG. 43. Thus, like reference numerals are used in both figures and the description of the actuator of FIG. 54 here is limited in the main to points which are different from the case of the actuator of FIG. 43.

The upper piezoelectric plate-shaped element 9a of the bimorph type actuator 9 has a rectangular stepped portion or recess 9d formed at a corner of the upper surface thereof at the free oscillating end of the actuator 9. An electric lead coupled to the bottom surface of the recess 9d, at which the piezoelectric portion of the element 9a is exposed, is coupled to a terminal 97. The terminal 97 in its turn is coupled to the actuator driving circuit 96 to supply a voltage C corresponding to the acceleration of the piezoelectric element 9a.

Figure 55:
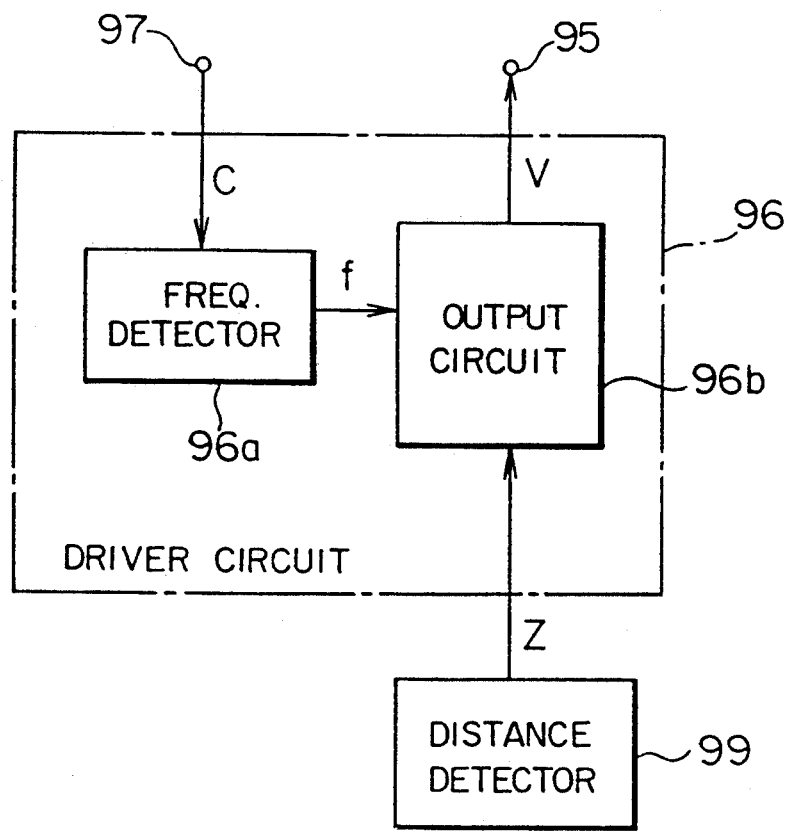
FIG. 55 is a block diagram of the driver circuit of the actuator of FIG. 54.

As shown in FIG. 55, the drive circuit 96 comprises, in addition to the output circuit 96b, a frequency detector circuit 96a for detecting the frequency f of the acceleration voltage C. The output circuit 96b outputs an actuator driving voltage V corresponding to the distance signal Z which, as remarked before, is output from a distance detector 99 which detects the distance between the magnetic head 8 and the recording surface of the disk 1. The output circuit 96b, however, modifies the level of the voltage V when the frequency f of the acceleration voltage C comes near or equal to the higher resonance frequencies (i.e. second and third resonance frequencies $f_2$ and $f_3$). Namely, when the frequency f of the acceleration voltage C comes near to or equal to the higher resonance frequencies, the output circuit 96b determines the magnitude of the factor by which the drive voltage V must be reduced, if the gain of the actuator is to be leveled at the frequency f near or equal to the higher resonance frequencies $f_2$ and $f_3$. In accordance with the determined reduction factor, the output circuit 96b reduces the level of the voltage V.

Figure 56:
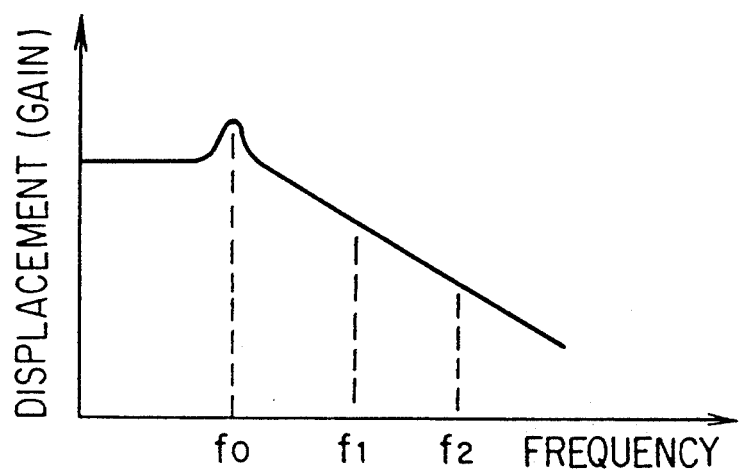
FIG. 56 is a graph showing the frequency characteristics of the gain of the actuator of FIG. 54.

Thus, the operation of the driver circuit 96 is identical unless the frequency of the vibration of the actuator 9 is outside of the neighborhoods of the higher resonance frequencies of the actuator 9. When, however, the frequency f of the acceleration voltage C, which frequency corresponds to the frequency of vibration of the actuator 9, comes into the neighborhood of a higher resonance frequency, the output level of the voltage V determined on the basis of the distance signal Z is reduced by a factor determined on the basis of the frequency f. Thus, as shown in FIG. 56, the gain, i.e. the amount of displacement in the direction B of the actuator with respect to the level of the driving voltage V, is leveled at the higher resonance frequencies $f_2$ and $f_3$. Thus, the actuator according to this embodiment can be used in a wide frequency range extending over the higher resonance frequencies. An advantage of the actuator according to this embodiment is this. The piezoelectric crystal exposed at the bottom of the recess 9d functions as an acceleration sensor of the actuator 9 and directly outputs an acceleration signal voltage. As a result, the frequency of the vibration of the actuator can be detected by a simple and inexpensive circuit organization.

Figure 57:
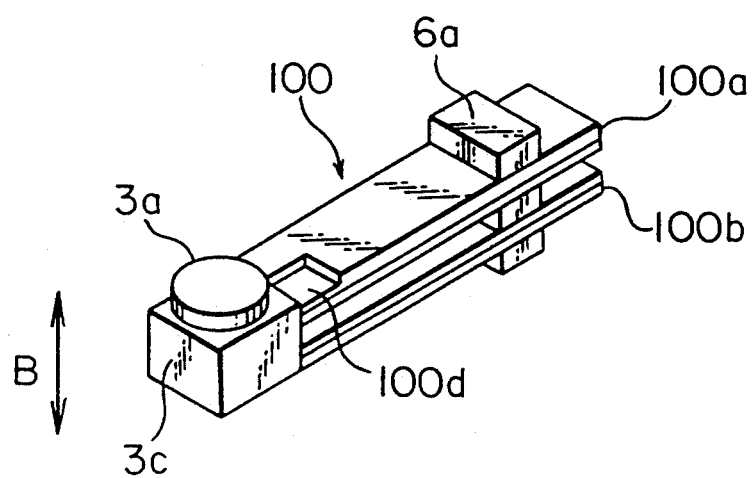
FIG. 57 is a perspective view of another bimorph type actuator having a recess on one of the parallel plate-shaped bimorph elements according to this invention, which recess is similar to that of the actuator of FIG. 54.

FIG. 57 shows another embodiment of an actuator 100 having a recess 100d for outputting an acceleration signal. The actuator 100 is used to support and drive the holder 3c of the objective lens 3a of a magneto-optical disk recording and reproducing device. Thus, for the purpose of avoiding the slanting of the lens 3a from the horizontal direction in the displacement or deflection in the vertical direction B, two plate-shaped parallel bimorph elements 100a and 100b fixedly supported at a vibration center thereof by supporting members 6a are coupled at the free end thereof to the holder 3c. The recess 100d formed on the upper bimorph element 100a is coupled to a drive circuit (not shown) as in the case of the actuator of FIG. 55.

The principle discussed above under this sub-heading for suppressing and levelling the gain or amount of displacement at the higher resonance frequencies of a bimorph type actuator is applicable to any actuators. For example, it is equally applicable to the actuators for controlling the tracking error of the magnetic head of a video tape recorder.

Optical Disk Device with an Electromagnetic Actuator

In the above headings, optical disk devices having a bimorph type actuator have been described. Under this heading, embodiments of optical disk recording and reproducing devices having an electromagnetic actuator for adjusting the position of its magnetic head are described. Since the optical disk devices described under this heading are similar in structure and operation to the optical disk devices described above, except for their electromagnetic actuators, descriptions hereinbelow are limited in the main to their electromagnetic actuators.

Figure 58:
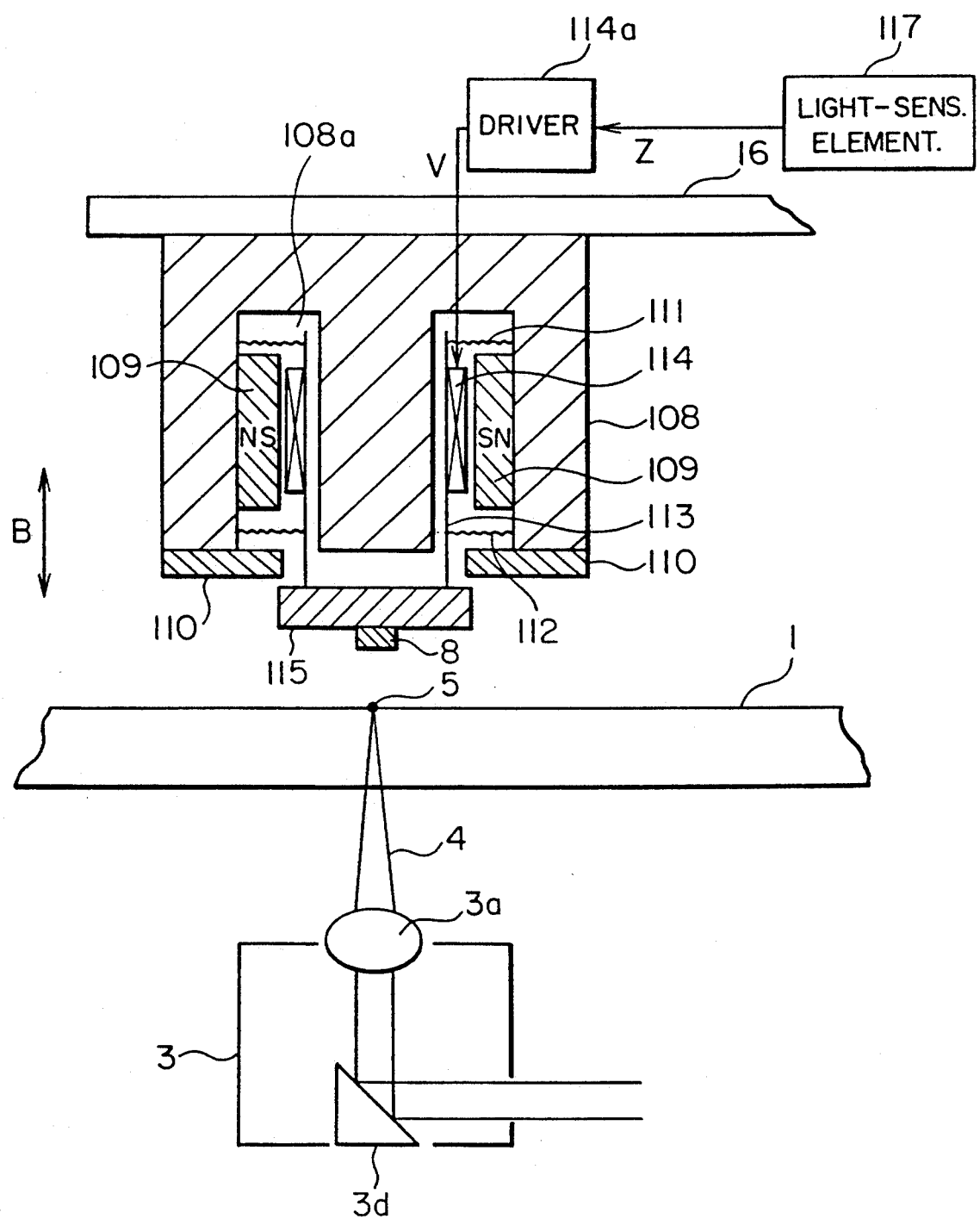
FIG. 58 is an axial sectional view of an electromagnetic actuator for driving the magnetic head of an optical disk recording and reproducing device according to this invention.

FIG. 58 shows a side elevational cross section of a first embodiment of an optical disk device having an electromagnetic actuator for driving the magnetic head. The device comprises an optical head 3 for radiating a light (laser) beam 4 on the disk 1 via an objective lens 3a and a reflection mirror 3d. The light beam 4 is converged at the spot 5 on the recording surface of the disk 1, on which recording of information is effected.

The structure of the electromagnetic actuator according to the embodiment of FIG. 58, which is shown in an exploded perspective view in FIG. 59 (wherein, it is noted, the parts are shown upside down with respect to their attitudes in FIG. 58) will now be described. First, the immobile portions of the actuator comprise a cylindrical yoke 108 fixedly mounted at the upper end surface thereof to the supporting base member 6 of the optical disk device, the yoke 108 having an annular recess 108a extending in its axial direction from the end surface thereof opposing the recording surface of the magneto-optical disk 1, an annular permanent magnet member 109 mounted to the radially inwards facing side surface of the recess 108a formed in the yoke 108, the annular magnet 109 being magnetized in the radial direction to have a south and a north pole at its inner and outer side surface, respectively, and a flat annular magnetic shield 110 made of a magnetic material, substantially closing the annular opening of the annular recess 108a of the yoke 108.

The movable parts which are moved with the magnetic head 8 of the optical disk device, on the other hand, have the following structure. A hollow cylindrical coil bobbin 113 carrying a coil 114 on the outer side surface thereof is coupled, via a pair of flat annular elastic support members 111 and 112, to the radially inwards facing side surface of the recess 108a of the yoke 108. To the end of the bobbin 113 opposing the recording surface of the disk 1 is mounted a substrate board 115 carrying the magnetic head 8 of the optical disk device. In addition to the magnetic head 8, the substrate board 115 carries on the surface opposing the recording surface of the optical disk 1 a light-emitting element 116 and a light-sensitive element 117 partitioned into two detector parts, as shown in FIG. 59, which elements 116 and 117 comprise an optical distance detector for detecting the distance between the magnetic head 8 and the recording surface of the disk 1.

Figure 59:
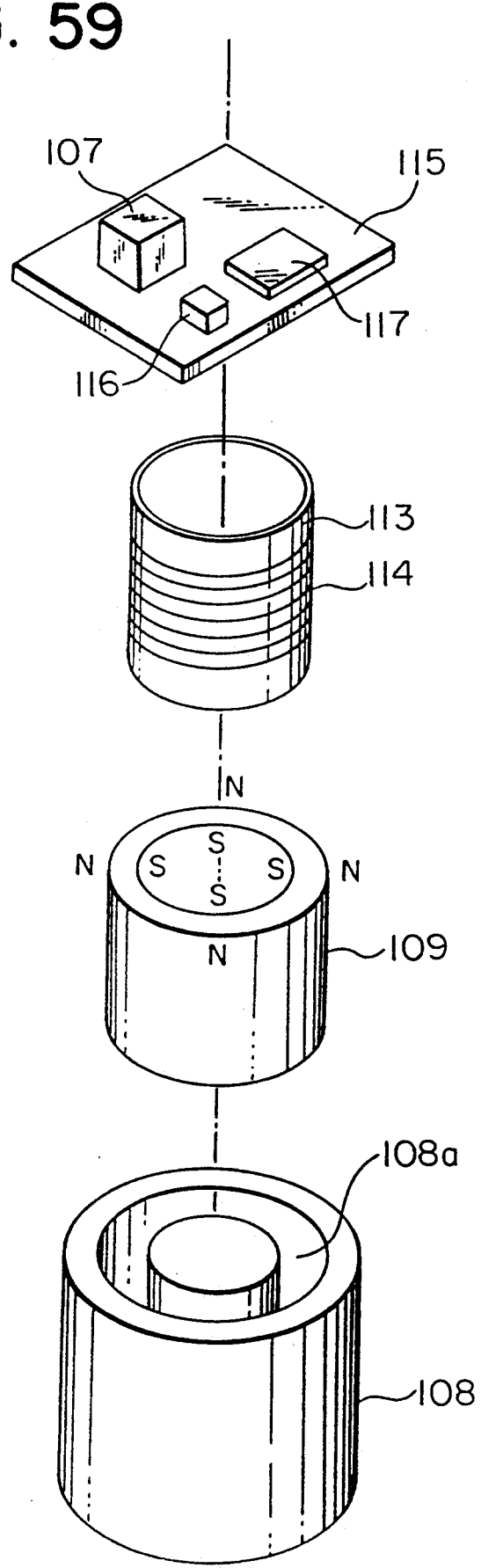
FIG. 59 is an exploded perspective view of the actuator of FIG. 58, showing the parts of the actuator upside down with respect to the attitudes thereof shown in FIG. 58.

The operation of the actuator of FIGS. 58 and 59 is as follows. When the recording is effected, the magnetic head 8 is energized to generate a biasing magnetic field at the recording spot of the disk 1 which is heated by the light beam 4 radiated from the optical head 3. The error of the distance between the magnetic head 8 and the recording surface of the disk 1 is detected by the optical distance detector comprising elements 116 and 117. Namely, the light emitted from the element 116 is reflected by the disk 1 to be received by the element 117. The distance error can be determined from the differential output of the two detector parts of the light-sensitive element 117. (For details of the operation of the optical distance detector, reference may be made to the description above concerning the optical distance detectors.) In response to the distance signal Z output from element 117, the actuator driver circuit 114a supplies a current, the magnitude of which corresponds to the distance error, to the coil 114 carried on the bobbin 113. Thus, by means of the electromagnetic force acting between the coil 114 and the permanent magnet 109, the bobbin 113 is driven in its axial direction to drive the magnetic head 8 carried on the substrate 115 in the direction B perpendicular to the recording surface of the disk 1. As a result, the error of the distance between the disk 1 and the magnetic head 8 is reduced, and the magnetic head 8 is maintained at a constant distance from the recording surface of the disk 1. The shield 110 prevents the magnetic flux from leaking to the magnetic head 8 from the magnetic circuit formed by the yoke 108 and the permanent magnet 109.

Figure 60:
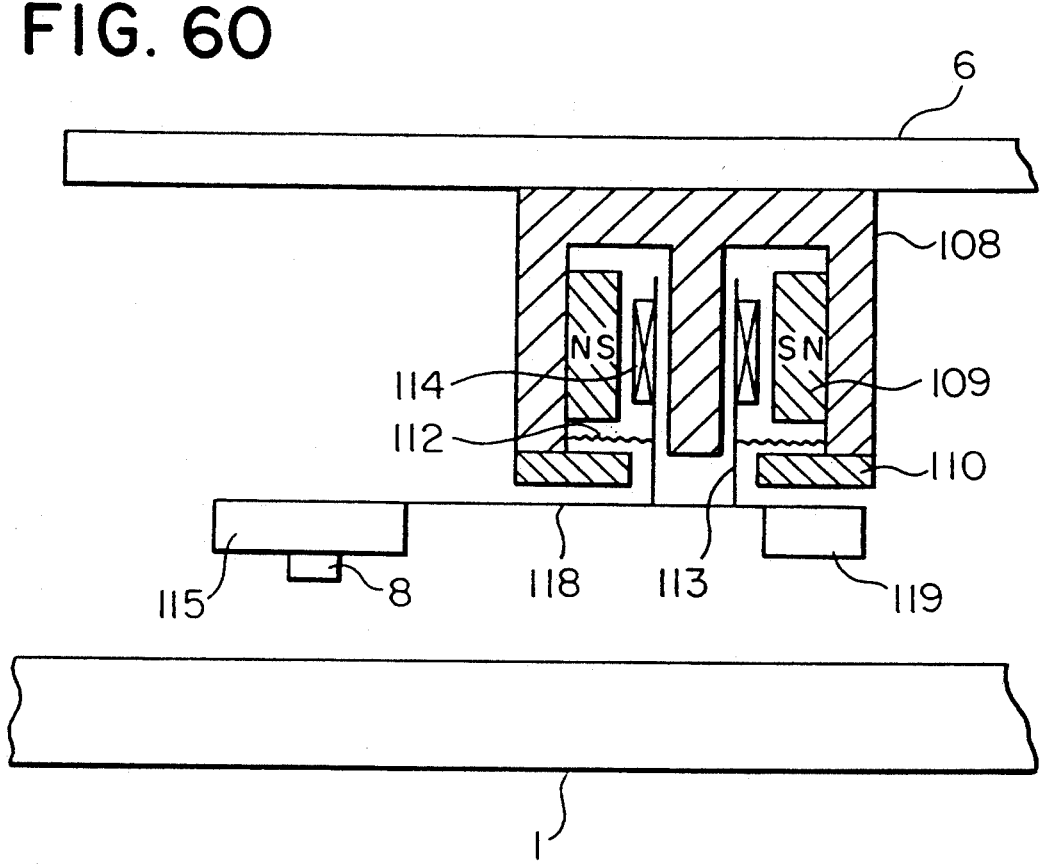
FIG. 60 is a view similar to that of FIG. 58, but showing another embodiment of an electromagnetic actuator according to this invention.

FIG. 60 shows a second embodiment of an optical disk device having an electromagnetic actuator. The device is identical to that of the first embodiment shown in FIGS. 58 and 59 (wherein like reference numerals represent like parts), except for the following points. The substrate board 115 carrying the magnetic head 8 and the optical distance detector (not shown) is mounted to an end of the bobbin 113 via a plate-shaped support member 118. The support member 118 is mounted to the end of the bobbin 113 opposing the disk 1. A balancing weight 119 is mounted to the end of the support member 118 opposite to the end to which the substrate board 115 is mounted. Further, the bobbin 113 is coupled to the yoke 108 via a single elastic support member 112.

Figure 61:
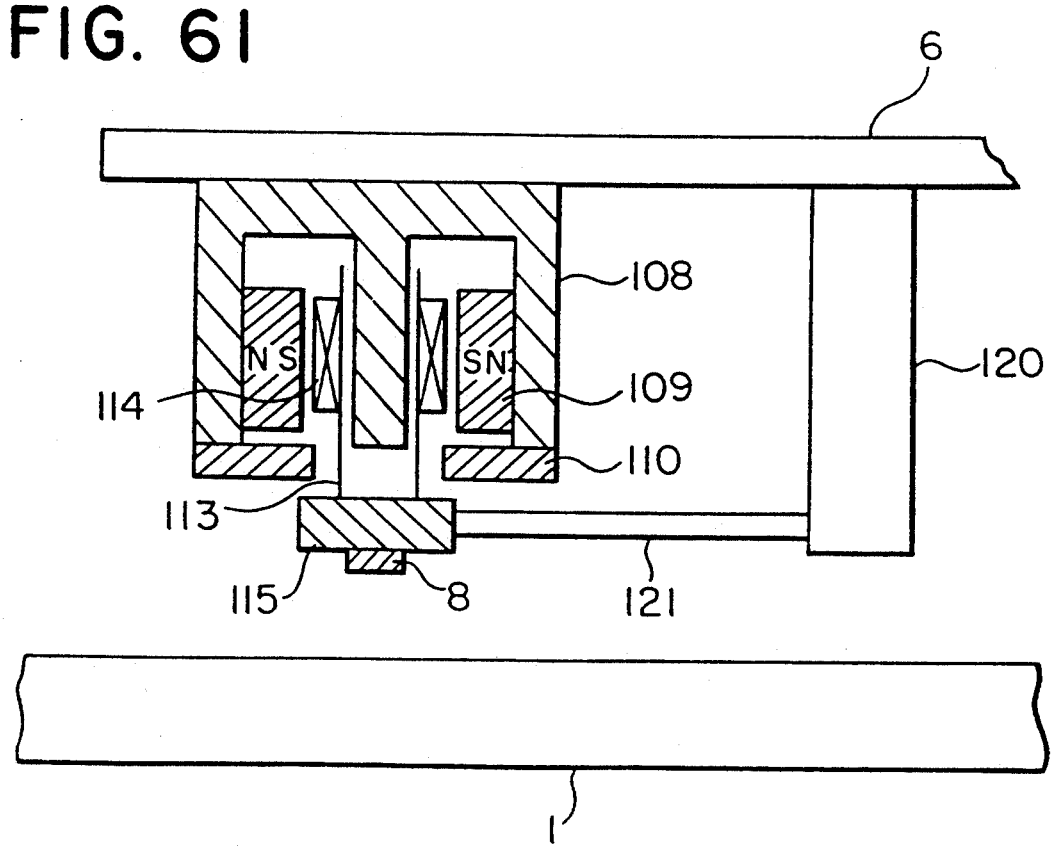
FIG. 61 is a view similar to that of FIG. 58, but showing still another embodiment of an electromagnetic actuator according to this invention.

FIG. 61 shows a third embodiment of an optical disk drive having an electromagnetic actuator. The device is identical to that of the first embodiment shown in FIGS. 59 and 60 (wherein like reference numerals represent like parts), except for the following points. The substrate board 115 carrying the magnetic head 8 and the optical distance detector (not shown) is coupled to an end of an elastic support member 121 which in turn is coupled at the other end thereof to a support member 120 fixed to the supporting base 6. Thus, the bobbin 113 carrying the coil 114 is supported by support members 120 and 121 via the substrate board 115 coupled to an end thereof.

It will be apparent to those skilled in the art that many modifications may be made to the optical disk recording and reproducing device having an actuator according to this invention. For example, a distance detector of the type utilizing the electrostatic capacity or the signal of the optical head for the detection of distance may be used instead of the optical distance detectors. Further, the actuators can be used for moving the magnetic head to allow a sufficient separation between the head and the disk during the loading and unloading of the optical disk. In such a case, the magnetic head is moved by the actuator in the direction away from the surface of the disk by a length of about 3 to 10 mm.

While we have described and shown particular embodiments of our invention, it will be understood that many modifications may be made without departing from the spirit thereof, and we contemplate by the appended claims to cover any such modifications as fall within the true spirit and scope of our invention.

What is claimed is:

1. A magneto-optical disk device for use with a magneto-optical disk including a layer of magnetic material defining a recording surface comprising:
    optical head means for radiating a recording surface of a magneto-optical disk with a light beam to heat a recording spot on the recording surface;
    magnetic head means for generating, in a recording process, a biasing magnetic field at the recording spot on the recording surface of the magneto-optical disk to record information by reversing a direction of magnetization of the magnetic material on the magneto-optical disk;
    distance detector means for detecting the distance between the magnetic head means and the recording surface of the magneto-optical disk;
    a bimorph type actuator including a plate-shaped piezoelectric bimorph type element having a free end on which the magnetic head means is mounted to oppose the recording surface of the magneto-optical disk, the bimorph element comprising a piezoelectric portion and an electrode on the piezoelectric portion, the electrode having a recess exposing the piezoelectric portion, the piezoelectric portion generating a voltage corresponding to acceleration of the actuator; and
    actuator driver means coupled to the distance detector means for driving the bimorph type actuator with a drive voltage in response to the distance detected by the distance detector means for varying the distance between the magnetic head means and the recording surface during the recording process, the actuator driver means being electrically coupled to the piezoelectric portion in the recess and reducing the drive voltage for the actuator in response to the voltage generated by the piezoelectric portion.

2. A bimorph type actuator for driving a recording and reproducing head of a recording and reproducing device for recording and reproducing information on and from a magneto-optical disk comprising:
    a plate-shaped piezoelectric bimorph element having a recess exposing a piezoelectric portion of the bimorph element, the exposed portion generating a voltage corresponding to acceleration of the bimorph element, the bimorph element having a plurality of resonance frequencies including a first resonance frequency and a higher resonance frequency;
    frequency detector means, electrically coupled to the recess of the bimorph element, for detecting a frequency of the voltage generated at the exposed piezoelectric portion of the bimorph element;
    distance detector means for detecting a distance between the head of the optical recording and reproducing device and the magneto-optical disk; and
    actuator driver means, coupled to the distance detector means and the frequency detector means, for outputting to the piezoelectric bimorph element an actuator driving voltage corresponding to a distance detected by the distance detector means and for reducing a level of the actuator driving voltage when the frequency of the voltage generated at the exposed piezoelectric portion of the bimorph element is in a neighborhood of the higher resonance frequency of the bimorph element.

3. A bimorph type actuator as claimed in claim 2, further comprising a second plate-shaped piezoelectric bimorph element adjoining and extending parallel to said plate-shaped piezoelectric bimorph element having a recess formed on a surface thereof.

4. A magneto-optical disk device for use with a magneto-optical disk having a recording surface comprising:
    an optical head for radiating a recording spot of the recording surface of a magneto-optical disk with a light beam;
    a magnetic head for generating a biasing magnetic field at the recording spot irradiated by the light beam on the recording surface of the magneto-optical disk;
    optical distance detector means for detecting the distance between the optical distance detector means and a portion of the magneto-optical disk;
    an actuator on which the magnetic head is mounted for adjusting the position of the magnetic head with respect to the disk; and
    an actuator driver coupled to the optical distance detector means for driving the actuator based on the distance detected by the optical distance detector means,
    the optical distance detector means comprising:
    light source means for radiating light towards the disk;
    first optical detector means for detecting an amount of light from the light source means incident on a light-receiving surface of the first optical detector means after reflection from the disk, the light-receiving surface being substantially perpendicular to an optical axis of the light source means;
    second optical detector means for detecting an amount of light from the light source means incident on a light-receiving surface of the second optical detector means after reflection from the disk, the light-receiving surface of the second optical detector means being situated on a plane including the light-receiving surface of the first optical detector means at a position farther away from the optical axis of the light source means than the light-receiving surface of the first optical detector means;
    subtractor means, coupled to outputs of the first and second optical detector means, for computing a difference between outputs of the first and second optical detector means;
    adder means, coupled to outputs of the first and second optical detector means, for computing a sum of outputs of the first and second optical detector means; and
    normalizer means, coupled to the subtractor means and the adder means, for computing a ratio of the difference between the outputs of the first and second optical detector means to the sum of the outputs of the first and second optical detector means wherein separations in a radial direction perpendicular to the optical axis of the light source means between the light source means and the first optical detector means and between the first and second optical detector means and areas of the first and second optical detector means are selected in such a manner that, in a measurement range of the measured distance between the disk and the optical distance detector means, the amount of light incident on the light-receiving surface of the first optical detector means decreases as the measured distance increases while the amount of light incident on the light-receiving surface of the second optical detector means increases as the measured distance increases so that the ratio, computed by the normalizer means, of the difference between the outputs of the first and second optical detector means to the sum of the outputs of the first and second optical detector means varies substantially linearly with respect to the measured distance.

5. A device as claimed in claim 4 wherein the outputs of said first and second optical detector means become equal to each other at a target value of said measured distance so that said ratio, computed by said normalized means, of the difference between the outputs of the first and second optical detector means to said sum of the outputs of the first and second optical detector means corresponds to a deviation of said measured distance from the target value.

6. A device as claimed in claim 5 wherein the light-receiving surfaces of said first and second optical detector means are stepped forward with respect to a light-emitting surface of the light source means, in the direction of the optical axis of the light source means toward the reflective surface of the disk.

7. A device as claimed in claim 6 wherein a height of the step between the light-receiving surfaces of the optical detector means and the light-emitting surface of the light source means in the direction of the optical axis of the light source means is greater than a thickness of the first and second optical detector means in the direction of the optical axis of the light source means.

8. A device as claimed in claim 4 wherein the light-receiving surfaces of said first and second optical detector means comprise surfaces disposed concentrically around the optical axis of the light source means.

9. A device as claimed in claim 8 wherein the light-receiving surfaces of said first and second optical detector means are stepped forward with respect to a light-emitting surface of the light source means in the direction of the optical axis of the light source means toward the reflective surface of the disk.

10. A device as claimed in claim 9 wherein a height of the step between the light-receiving surfaces of the optical detector means and the light-emitting surface of the light source means in the direction of the optical axis of the light source means is greater than a thickness of the first and second optical detector means in the direction of the optical axis of the light source means.

11. A device as claimed in claim 4 wherein the light-receiving surfaces of said first and second optical detector means are stepped forward with respect to a light-emitting surface of the light source means in the direction of the optical axis of the light source means toward the reflective surface of the disk.

12. A device as claimed in claim 11 wherein a height of the step between the light-receiving surfaces of the optical detector means and the light-emitting surface of the light source means in the direction of the optical axis of the light source means is greater than a thickness of the first and second optical detector means in the direction of the optical axis of the light source means.

13. A magneto-optical disk device for use with a magneto-optical disk including a layer of magnetic material defining a recording surface comprising:
   optical head means for radiating a recording spot on the recording surface of a magneto-optical disk with a light beam;
   magnetic head means for generating, in a recording process, a biasing magnetic field at the recording spot on the recording surface of the magneto-optical disk to record information by reversing a direction of magnetization of the magnetic material on the magneto-optical disk;
   a bimorph type actuator including a plate-shaped piezoelectric bimorph type element having a free end on which the magnetic head means is mounted to oppose the recording surface of the magneto-optical disk;
   distance detector means for detecting the distance between the magnetic head means and the recording surface of the magneto-optical disk, the distance detector means comprising a support spaced from said bimorph type actuator, light emitting means mounted on the support for emitting light towards the disk and towards the bimorph type actuator, a first photosensitive element mounted on said support for receiving light from said light emitting means after reflection from said disk, and a second photosensitive element mounted on said support for receiving light from said light emitting means after reflection from a surface of said bimorph type actuator; and
   actuator driver means coupled to the distance detector means for generating a drive voltage for the bimorph type actuator in response to the distance detected by the distance detector means.

14. A device as claimed in claim 13 wherein said light emitting means comprises first and second light emitting elements mounted on said support, and said first photosensitive element receives light from said first light emitting element reflected from said disk and said second photosensitive element receives light from said second light emitting element reflected from a surface of said bimorph type actuator.

15. A magneto-optical disk device for use with a magneto-optical disk including a layer of magnetic material defining a recording surface comprising:
   optical head means for radiating a recording surface of a magneto-optical disk with a light beam to heat a recording spot on the recording surface;
   magnetic head means for generating, in a recording process, a biasing magnetic field at the recording spot on the recording surface of the magneto-optical disk to record information by reversing a direction of magnetization of the magnetic material on the magneto-optical disk;
   a bimorph type actuator including a plate-shaped piezoelectric bimorph type element having a free end on which the magnetic head means is mounted to oppose the recording surface of the magneto-optical disk;
   distance detector means for detecting the distance between the magnetic head means and the recording surface of the magneto-optical disk, the distance detector means comprising a light emitting element mounted on said bimorph type actuator and a photosensitive element mounted on said bimorph type actuator in a position to receive light from said light emitting element reflected from said disk; and actuator driver means coupled to the distance detector means for driving the bimorph type actuator with a drive voltage in response to the distance detected by the distance detector means for varying the distance between the magnetic head means and the recording surface during the recording process.

* * * * *